United States Patent
Nallabothula et al.

(10) Patent No.: US 11,334,418 B2
(45) Date of Patent: *May 17, 2022

(54) CLOUD-BASED RECOVERY SYSTEM

(71) Applicant: Microsoft Technology Licensing, LLC, Redmond, WA (US)

(72) Inventors: Kiran Nallabothula, Redmond, WA (US); Dylan Symington, Seattle, WA (US); Nagaraju Palla, Bothell, WA (US); Amanda A. Alvarado, Woodinville, WA (US); Ricardo Soares Stern, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/151,434

(22) Filed: Jan. 18, 2021

(65) Prior Publication Data

US 2021/0141682 A1 May 13, 2021

Related U.S. Application Data

(63) Continuation of application No. 16/405,202, filed on May 7, 2019, now Pat. No. 10,929,219, which is a continuation of application No. 15/437,741, filed on Feb. 21, 2017, now Pat. No. 10,338,991.

(51) Int. Cl.
*G06F 11/00* (2006.01)
*G06F 11/07* (2006.01)
*G06F 11/22* (2006.01)

(52) U.S. Cl.
CPC ........ *G06F 11/079* (2013.01); *G06F 11/0709* (2013.01); *G06F 11/0793* (2013.01); *G06F 11/2294* (2013.01)

(58) Field of Classification Search
CPC .............. G06F 11/079; G06F 11/2294; G06F 11/0709; G06F 11/0793
USPC .................................................... 714/1–57
See application file for complete search history.

(56) References Cited

U.S. PATENT DOCUMENTS

| | | | | |
|---|---|---|---|---|
| 7,320,114 | B1 * | 1/2008 | Jain | G06F 11/261 714/47.1 |
| 8,504,880 | B2 * | 8/2013 | Li | G06F 11/0769 714/48 |
| 2002/0174388 | A1 * | 11/2002 | Hommel | H04L 41/0677 714/47.1 |
| 2005/0138031 | A1 * | 6/2005 | Wefers | G06Q 10/06311 |
| 2007/0067678 | A1 * | 3/2007 | Hosek | G06F 11/008 714/25 |
| 2007/0220371 | A1 * | 9/2007 | Duyanovich | G06F 11/3485 714/49 |
| 2010/0023810 | A1 * | 1/2010 | Stolfo | G06F 11/0751 714/38.11 |

(Continued)

*Primary Examiner* — Sarai E Butler
(74) *Attorney, Agent, or Firm* — Christopher J. Volkmann; Kelly, Holt & Christenson, PLLC

(57) ABSTRACT

A computing system in a server environment receives a diagnostic data package, corresponding to a problem, from a client computing system and runs a problem-specific analyzer to generate additional problem-specific data. A root cause for the problem is identified along with a recovery action, based on the diagnostic data package and the additional problem-specific data. The root cause and recovery action are communicated to the client computing system.

20 Claims, 22 Drawing Sheets

(56) References Cited

U.S. PATENT DOCUMENTS

| | | | |
|---|---|---|---|
| 2013/0059578 A1* | 3/2013 | Finberg | H04L 12/6418 455/425 |
| 2015/0046512 A1* | 2/2015 | Ashby | H04L 43/08 709/203 |
| 2015/0121136 A1* | 4/2015 | Namkoong | G06F 11/079 714/15 |
| 2018/0114120 A1* | 4/2018 | Bostick | G06N 20/00 |

* cited by examiner

CLOUD-BASED RECOVERY SYSTEM

CROSS-REFERENCE TO RELATED APPLICATIONS

The present application is a continuation of and claims priority of U.S. patent application Ser. No. 16/405,202, filed May 7, 2019, which is a continuation and claims priority of U.S. patent application Ser. No. 15/437,741, filed Feb. 21, 2017, the contents of which are hereby incorporated by reference in their entirety.

BACKGROUND

Computing systems are currently in wide use. Some computing systems include remote server environments that host services that can be accessed by client computing systems. The client computing systems, themselves, may run one or more applications as well. The applications may be client components of the service hosted at the remote server environment, or they may be other applications.

The client computing systems often generate user interfaces for interaction by users. When a user encounters a problem with an application (such as an issue which degrades or inhibits the performance of the application), the user may use a reporting mechanism to report the issue or problem to a support mechanism. For instance, the support mechanism may be a support service that connects users with support engineers or other support personnel in order to attempt to address issues or problems encountered by the users. Often, the support person does not have enough information to quickly discover the root cause of the issue, and normally there is not enough information available to do so automatically.

Users often attempt to address the problem, themselves, by navigating their way through a help or troubleshooting flow in the application. Whether the user does this, or contacts a support person, the user's description of the problem is often not enough to diagnose the problem. This results in a great deal of trial and error, and back and forth communications between the support person and the user, before a solution can be found, if one can even be found.

Some applications collect general log information every time the user encounters a certain error condition (such as an error condition that is detected by code or triggered by a user clicking a "help/report bug" button, or similar). In either of these cases, the information that is available for collection and for use in diagnosing the issue is information that is stored in memory, such as in general logs.

In other scenarios, the user may open a support ticket with a support organization. The support engineers (or other support personnel at the support organization) may have data collection tools that they then ask the user to download and run, in order to collect data. Again, this creates a great deal of back and forth traffic between the user and the support person. Similarly, the data collection tools are only downloaded and run, well after the user has encountered the problem.

The discussion above is merely provided for general background information and is not intended to be used as an aid in determining the scope of the claimed subject matter.

SUMMARY

A computing system in a server environment receives a diagnostic data package, corresponding to a problem, from a client computing system and runs a problem-specific analyzer to generate additional problem-specific data. A root cause for the problem is identified along with a recovery action, based on the diagnostic data package and the additional problem-specific data. The root cause and recovery action are communicated to the client computing system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
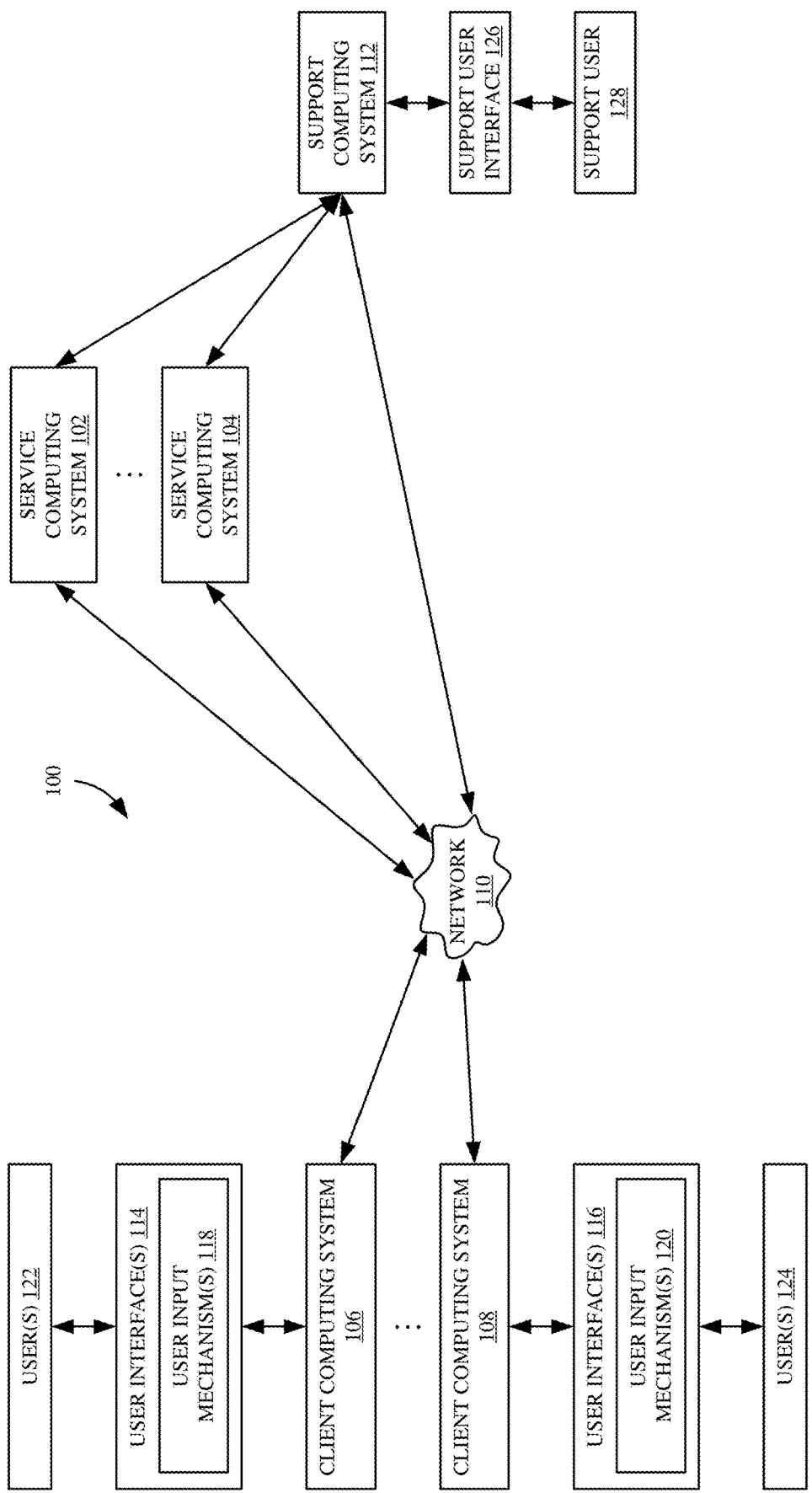
FIG. 1 is a block diagram of one example of a computing system architecture.

FIG. 1 is a block diagram of one example of a computing system architecture 100. Architecture 100 shows a plurality of service computing systems 102-104 connected to a plurality of different client computing systems 106-108 through a network 110. Architecture 100 also shows that a support computing system 112 can be connected to service computing systems 102-104 as well as to network 110. Network 110 can be any of a wide variety of different types of networks, such as a wide area network, a local area network a cellular communication network, or any of a wide variety of other networks or combinations of networks.

In the example shown in FIG. 1, each of the client computing systems 106-108 is shown generating user interfaces 114-116, with user input mechanisms 118-120, for interaction by users 122-124, respectively. Users 122-124 illustratively interact with the user input mechanisms 118-120 in order to control and manipulate client computing systems 106-108, and ultimately one or more of service computing systems 102-104, respectively.

FIG. 1 also shows that, in one example, support computing system 112 generates a support user interface 126 that can also have user input mechanisms. A support user 128 (which may be a support engineer, or other support person) illustratively interacts with the user input mechanisms on support user interface 126 in order to control and manipulate support computing system 112. In some examples, support user 128 can also use these items in order to control and manipulate one or more of the service computing systems 102-104 and even one or more of the client computing systems 106-108.

Before describing architecture 100 in more detail, a brief overview will first be provided. Each client computing system (for example client computing system 106) illustratively runs one or more applications that can be used by the corresponding users (for example user 122). It may be that user 122 encounters an error or problem in running or using the application. In that case, a diagnostic system on the client computing system (for example client computing system 106) illustratively identifies a problem scenario (e.g., identifies a problem category or classifies the problem into a problem class, based on the data collected or symptoms observed) and collects problem-specific data and runs problem-specific analyzers on the corresponding client computing system.

It then generates a diagnostic data package containing the data it collected and the data that may have been generated by the analyzers, along with a problem scenario identifier and sends that package to a service computing system, such as service computing system 102. Service computing system 102 also illustratively includes one or more problem-specific analyzers and a diagnostic system that runs those analyzers to generate additional diagnostic information, based upon the package received from the client system 106. It aggregates the problem-specific data from the client computing system 106 with the problem-specific data it generated itself and analyzes that data to identify a root cause of the problem. Once the root cause of the problem is identified, it illustratively identifies a remedial action that can be taken to address the problem. It can send this information back to the client computing system 106 that had the problem and surface that information to its user 122. Similarly, the aggregated diagnostic data can be stored on service computing system 102 where it can be searched and accessed by support user 128 through support computing system 112. The support computing system 112 can further be used by support user 128 to identify the error and potential solutions to the error.

Figure 2:
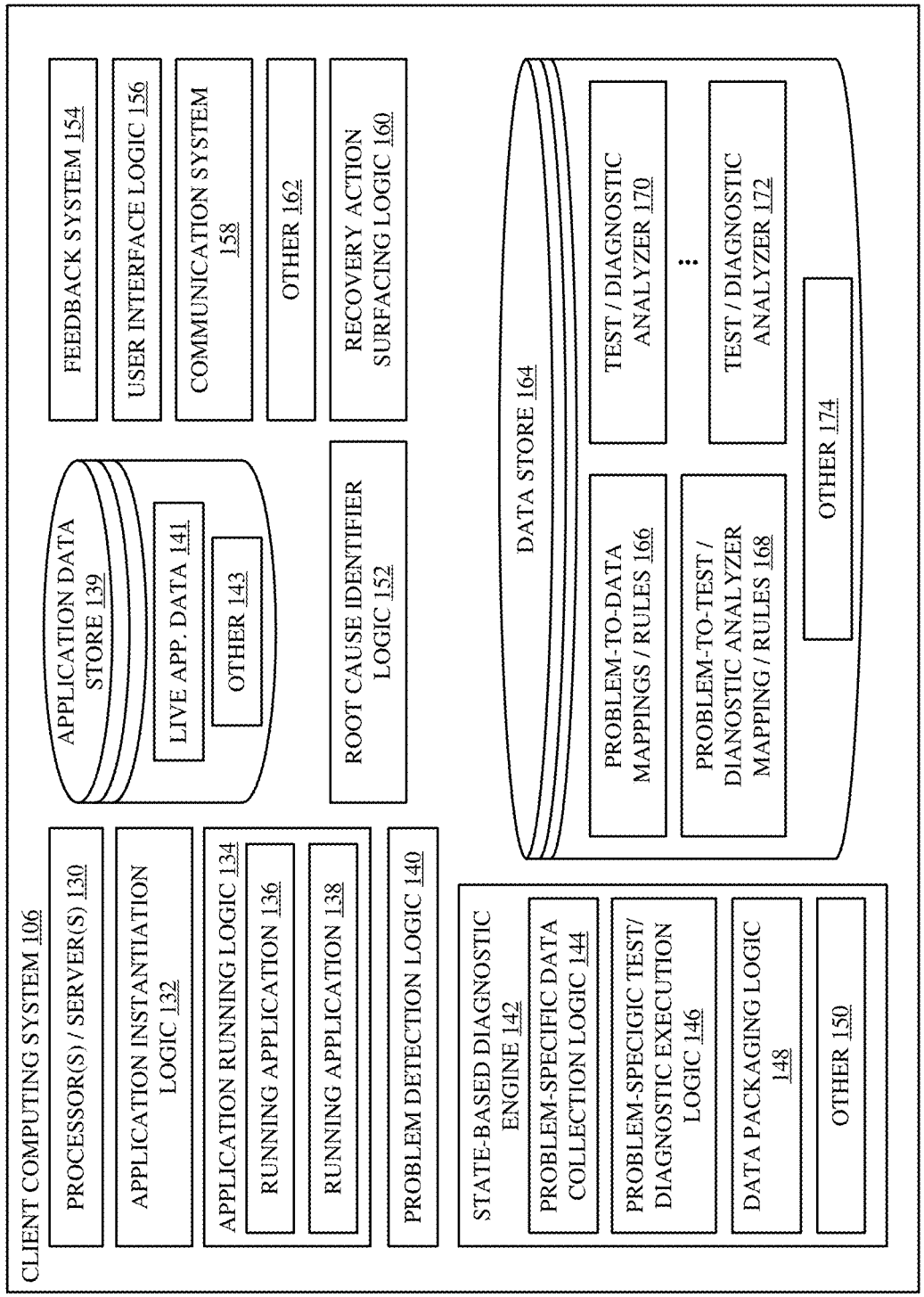
FIG. 2 is a more detailed block diagram of one example of a client computing system.

FIG. 2 shows one example of a more detailed block diagram of a client computing system (in the example shown in FIG. 2 it is client computing system 106). It will be appreciated that client computing systems 106-108 can be similar or different and they can be used by different users, users at different tenants or organizations, or in other ways. For the purposes of the present discussion, it is assumed that client computing systems 106-108 are similar so that only client computing system 106 is described in more detail.

Client computing system 106 illustratively includes one or more processors or servers 130, application instantiation logic 132, application running logic 134 that can run one or more applications 136-138, and application data store 139 that stores live application data 141 that is generated by, or acted on by, the running applications. Data store 139 can store other items as well.

Client computing system 106 can also include problem detection logic 140, and state-based diagnostic engine 142. State-based diagnostic engine 142 can include problem-specific data collection logic 144, problem-specific test/diagnostic execution logic 146, data packaging logic 148, and it can include other items 150. Client computing system 106 can also include root cause identifier logic 152, feedback system 154, user interface logic 156, communication system 158, recovery action surfacing logic 160, and a wide variety of other items 162. Client computing system 106 can also include data store 164. Data store 164, itself, can include problem-to-data mappings/rules 166, problem-to-test/diagnostic analyzer mappings/rules 168, a set of test/diagnostic analyzers 170-172, and it can include a wide variety of other items 174.

Before describing client computing system 102 in more detail, a brief overview of some of the items in client computing system 106, and their operation, will first be provided. Application instantiation logic 132 illustratively instantiates applications 136-138. Application running logic 134 runs the instantiated applications which generate or operate on live application data 141. Some of those applications can generate user interfaces and user input mechanisms for interaction by users of client computing system 106.

Problem detection logic 140 illustratively detects problems with one or more of the applications. As is described below, this can be done by automatic detection, or by the user providing an input (such as a textual input describing a problem, interacting with a support user interface, etc.). Problem-specific data collection logic 144 then identifies and collects problem-specific data, given the problem identified by problem detection logic 140. In doing so, data collection logic 144 can access problem-to-data mappings or rules 166 that map from a detected problem to data that should be collected for that problem. The data can be collected from logs or other places. Problem-specific test/diagnostic execution logic 146 identifies one or more test/diagnostic analyzers 170-172 that should be run, given the detected problem. To do this, logic 146 can access problem-to-test diagnostic analyzer mappings or rules 168 that map from detected problems to the various analyzers 170-172 that can be run. Those analyzers can generate additional data as well.

Data packaging logic 148 illustratively packages the problem-specific data collected by collection logic 144 and any additional problem-specific data generated by any analyzers run by test/diagnostic execution logic 146. Data packaging logic 148 can use communication system 158 in order to communicate the diagnostic data package to one or more of the service computing systems. For purposes of the present example, it will be assumed that it communicates it to service computing system 102.

Communication system 158 can be any communication system that communicatively couples client computing system 106 with service computing system 102. Thus, it can be a communication system that communicates over any different type of network 110.

When communication system 158 receives a recovery action that has been identified by service computing system 102, it provides it to recovery action surfacing logic 160. Logic 160 can surface the recovery action in a variety of different ways. For instance, if it is an automatic or semi-automatic recovery action, instructions to perform the manual part of the action can be displayed to the user using user interface logic 156. When it is a fully automatic recovery action, the recovery action surfacing logic 160 can generate control signals to perform the recovery action, and it can also use user interface logic 156 to surface a notification to that effect for the user. Further, it may be that the recovery action is to be taken by an administrative user. If that is the case, logic 160 can use communication system 158 to communicate the recovery action to the administrative user and can also surface a notification of this to the user as well.

Feedback system 154 illustratively generates and displays a user input mechanism that user 122 can use to provide feedback as to the efficacy of the suggested recovery action. This is described in greater detail below with respect to FIGS. 12A-12E.

Figure 3:
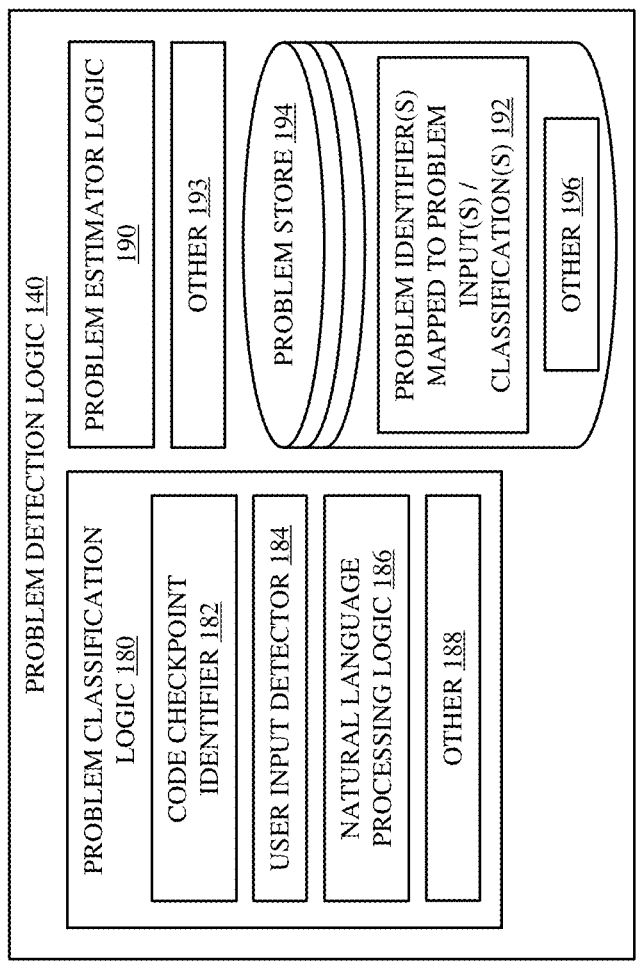
FIG. 3 is a more detailed block diagram of one example of problem detection logic.

FIG. 3 is a block diagram illustrating one example of problem detection logic 140, in more detail. Problem detection logic 140 illustratively includes problem classification logic 180 which can, itself, include a variety of different items for classifying problems. For instance, it can include code check point identifier 182, user input detector 184, natural language processing logic 186, and other items 188. Code check point identifier 182 can identify problems that occur and are identified or triggered by a code check point. User input detector 184 illustratively detects a user input where the user identified a problem. For instance, the user may provide a textual input in a text box, or the user may select a particular problem from a drop down menu, etc. Where the user provides text or another natural language input, problem classification logic 180 can use natural language processing logic 186 (which may reside elsewhere and be called by problem classification logic 180) to determine a semantic or linguistic meaning of the user of the natural language input, to again identify or classify the problem.

Problem detection logic 140 can also include problem estimator logic 190 that is configured to estimate the problem (or at least a class for the problem) based upon the information generated by problem classification logic 180. In doing so, problem estimator logic 190 can access problem identifiers that are mapped to the problem inputs or classifications generated by block 180. Such maps can be stored as problem identifier maps 192, in problem store 194. Problem store 194 can also include other items 196.

Problem estimator logic 190 may also be used to generate a likelihood or probability or other metric indicative of the confidence that problem detection logic 140 has in the problem that it has identified. Various components of client computing system 106 or other items in architecture 100 can be configured to take different actions based upon the corresponding confidence level metric. Some of these are described in greater detail below.

Figure 4:
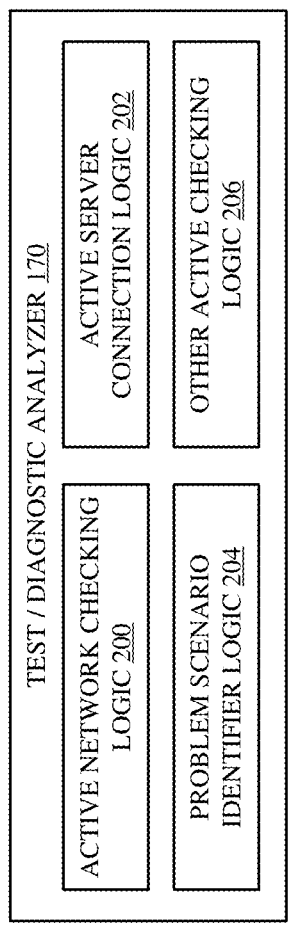
FIG. 4 is a more detailed block diagram of one example of a test/diagnostic analyzer.

FIG. 4 is a more detailed block diagram of one example of a test/diagnostic analyzer 170. Analyzer 170 can include active network checking logic 200, active server connection logic 202, live application data accessing logic 203, problem scenario identifier logic 204, and it can include a wide variety of other active checking logic 206. When problem-specific test/diagnostic execution logic 146 identifies and runs test/diagnostic analyzer 170, or other problem-specific analyzers, those analyzers can actively gather data that is not already available. For instance, active network checking logic 200 can run in client computing system 106 to determine whether client computing system 106 is connected to network 110 (or any other networks). It can generate information indicative of whether that connection exists, whether it is healthy, whether it has been terminated, etc.

Active server connection logic 202 can also run in client computing system 106, when a user reports a problem or one is otherwise detected. It can run, for instance, when the problem reported or detected is indicative of a problem with connectivity to a server at a remote computing environment, or another remote computing system. Data indicative of such a connection will normally not be stored on client computing system 106 unless the connection was opened and closed relatively recently. Active server connection logic 202 can thus operate to actively attempt to open a connection to the server and obtain data it needs to troubleshoot connectivity, if any is available.

Live application data accessing logic 203 can access the live application data 141 that is loaded into active memory and being generated by, or acted upon, by the application having the problem. It can retrieve the data as diagnostic data or analyze the data to generate other diagnostic data. Problem scenario identifier logic 204 can identify a particular problem scenario based upon the data generated by logic 200, logic 202, or other active checking logic 206.

Figure 5:
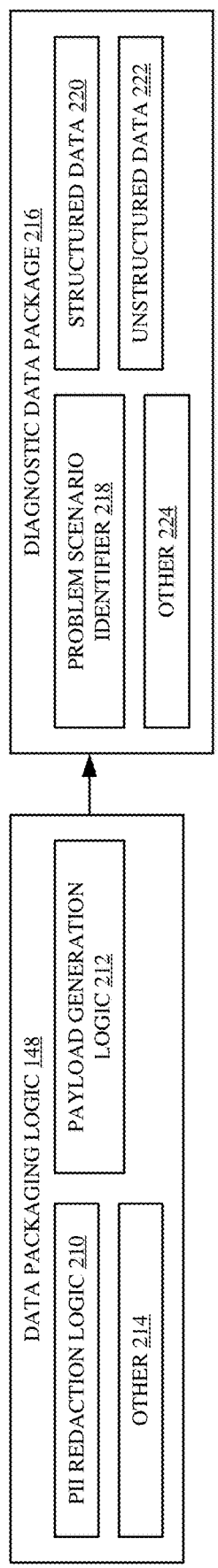
FIG. 5 is a more detailed block diagram of one example of data packaging logic.

FIG. 5 is a block diagram showing one example of data packaging logic 148 in more detail. Data packaging logic 148 can include personally identifiable information (PII) redaction logic 210, payload generation logic 212, and it can include other items 214. PII redaction logic 210 illustratively redacts any PII from any of the diagnostic data that was collected by problem-specific data collection logic 144, or generated by problem-specific test/diagnostic execution logic 146 or any of the analyzers that were run. For instance, it may be configured to identify and redact e-mail addresses, and perhaps replace them with a different string. It can identify and redact passwords, specific user profile information, or any other PII.

Once the diagnostic data has been scrubbed by PII redaction logic 210, payload generation logic 212 illustratively generates a diagnostic data package 216 that can be sent, using communication system 158 (in FIG. 2) to a service computing system 102. The diagnostic data package 216 can include a problem scenario identifier 218 that identifies a problem scenario that was determined by problem scenario identifier logic 204. For instance, a problem scenario may be a category or class that the problem fits into, such as "connectivity issues", "network issues", or any other information that identifies a problem scenario that the client computing system 106 is experiencing. It can also include a structured data portion 220 which provides data in a structured, predefined way. For instance, a structured data portion identifying a particular e-mail server may be "e-mail server: Contosomail.com". Of course, this is only one example.

Diagnostic data package 216 can include an unstructured data portion 222 as well. The unstructured data portion may be raw log data that is collected by problem-specific data collection logic 144, or other unstructured data. The diagnostic data package 216 can include a wide variety of other information 224 as well.

Figure 6A:
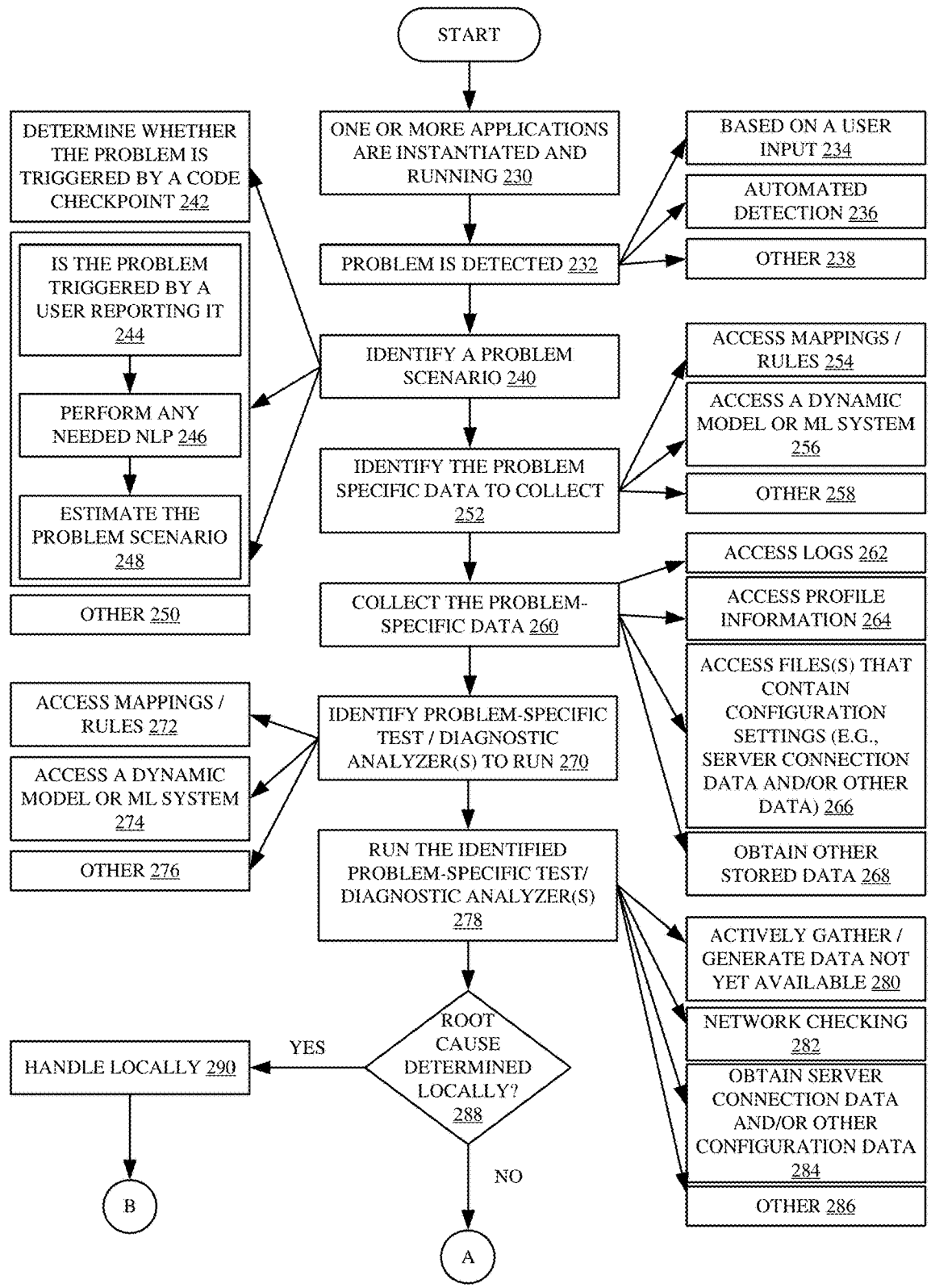
FIGS. 6A and 6B (collectively referred to herein as FIG. 6) show one example of a flow diagram indicating the operation of the client computing system shown in FIG. 2 in operating based on a detected problem or error.
Figure 6B:
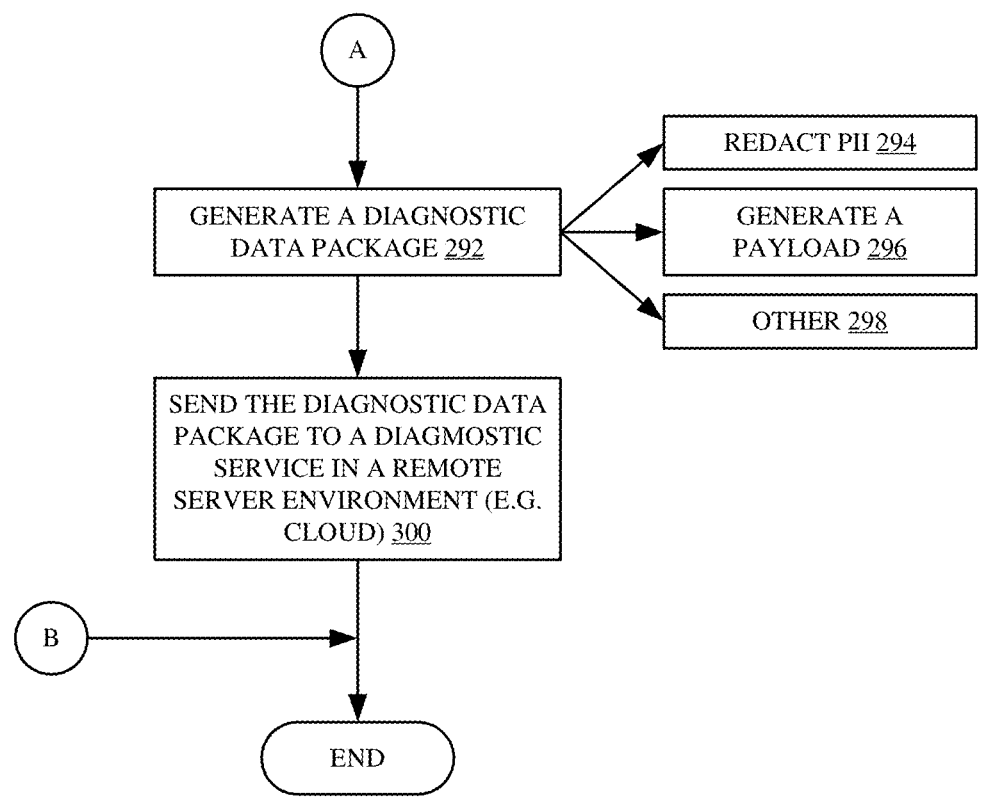

FIGS. 6A and 6B (collectively referred to herein as FIG. 6) illustrate one example of the operation of architecture 100 (and in particular client computing system 106) in generating and sending a diagnostic data package in response to detection of an issue, or problem with an application on the client computing system 106. It is first assumed that one or more of the applications 136-138 are instantiated and running on client computing system 106. This is indicated by block 230 in FIG. 6.

Problem detection logic 140 then detects a problem with one of the applications. This is indicated by block 232. For instance, user input detector 184 may detect a problem based on a user input indicating that a problem has been encountered. This is indicated by block 234. Code check point identifier 182 may detect a problem that arises (or is reported) by an application at a code check point. This can be done in an automated way as indicated by block 236. It will be noted that problems can be detected in a wide variety of other ways as well, and this is indicated by block 238.

Problem detection logic 140 then identifies a problem scenario corresponding to the detected problem. This is indicated by block 240. For instance, problem classification logic 180 can determine whether the problem was triggered by a code check point as indicated by block 242. It can determine whether it was triggered by the user reporting it as indicated by block 244. If, for instance, it determines that the user has reported a problem by entering text into a text box, it can also use natural language processing logic 186 to perform any needed natural language processing on the user input. This is indicated by block 246. It will also be noted that the natural language processing can be performed on a remote service which is called by problem detection logic 140 or problem classification logic 180. It is shown in FIG. 3 as being part of problem classification logic 180 for the sake of example only.

Problem estimator logic 190 then estimates the problem scenario based upon the natural language processing results or in other ways. This is indicated by block 248. For instance, it can access the problem identifiers that are mapped to problem inputs or to the classifications detected or generated in problem classification logic 180. It can estimate a confidence level corresponding to the identified problem scenario and it can perform other processing as well. This is indicated by block 250 in the flow diagram of FIG. 6.

Problem specific collection logic 144 then identifies the problem-specific data that it is to collect. This is indicated by block 252 in FIG. 6. For instance, it can access the problem-to-data mappings or rules 166 which map the identified problems or problem scenarios to the problem-specific data that is to be collected. Accessing mappings or rules is indicated by block 254. It can also access a dynamic model or machine learning system that identifies different problem-specific data, given an identified problem or problem scenario. This is indicated by block 256. Based on user feedback, the model or machine learning system can adapt to provide better indications of problem-specific data, based on various problems. The problem-specific data collection logic 144 can identify the problem-specific data to collect in other ways as well, and this is indicated by block 258.

Problem-specific data collection logic 144 then collects the problem-specific data that was identified at block 252. This is indicated by block 260. For instance, it can access log data where data has been logged either by the running application that encountered the problem or by other components or systems. This is indicated by block 262. It can access profile information for this user as indicated by block 264, or it perform automatic discovery of one or more files (which may be in XML format) that contain configuration settings (such as server connection data and/or other data) for the user's account. This configuration information can be used for data collection and is indicated by block 266. It can obtain other stored data as well, and this is indicated by block 268.

Problem-specific test/diagnostic execution logic 146 then identifies any problem-specific test or diagnostic analyzers 170-172 that are to be run, given the identified problem or problem scenario. This is indicated by block 270 in the flow diagram of FIG. 6. In doing so, it may access the problem-to-test/diagnostic analyzer mappings or rules 168. This is indicated by block 272. The rules may map one or more predefined problems or problem scenarios to a particular set of analyzers that are to be run when that problem is encountered.

Logic 146 can also access a dynamic model or machine learned system to identify which analyzers to run. This is indicated by block 274. For instance, based on user feedback or feedback of a support person after the problem is resolved, the dynamic model or machine learning system may adapt to better identify which particular analyzers should be run, when a particular problem or problem scenario is identified.

Logic 146 can identify which analyzers to run in other ways as well. This is indicated by block 276 in the flow diagram of FIG. 6. Problem-specific test/diagnostic execution logic 146 then runs the identified test or diagnostic analyzers to generate any additional diagnostic data. This is indicated by block 278 in the flow diagram of FIG. 6. In doing so, the analyzer may actively gather or generate data that is not yet available (such as data that is not yet stored on the client computing system 106, or otherwise available). This is indicated by block 280. In one example, an analyzer can perform a network check which can verify whether there are problems in the connection between the client computing system 106 and network 110. Performing network checking analysis is indicated by block 282.

In another example, the analyzer can perform different types of checks based on the server connection data and/or other configuration settings. For instance, when a user reports a problem with connectivity to a particular server, data about that connection may not be available on client computing system 106 unless the connection was opened and then closed relatively recently. Thus, the analyzer may actively try to open a connection to that server and obtain data it needs to troubleshoot connectivity with that server. Obtaining server connection data is indicated by block 284. A variety of other analyzers can be run as well, to actively gather or generate other data not already available in logs. This is indicated by block 286.

It may be that, based upon the diagnostic data obtained by state-based diagnostic engine 142, root cause identifier logic 152 can locally identify a root cause of the problem. This may happen, for instance, where a user is not connected to his or her e-mail server because he or she doesn't have any network connection at all. However, in many cases, the root cause identifier logic 152 on the client computing system 106, alone, may not be able to detect the root cause of the problem that was encountered. Thus, at block 288, if the root cause can be determined locally, it may be able to be handled locally as indicated by block 290. However, if not, then data packaging logic 148 illustratively generates a diagnostic data package that includes the various diagnostic data that was collected or generated by state-based diagnostic engine 142. Generating a diagnostic data package is indicated by block 292 in the flow diagram of FIG. 6. In doing so, as discussed above, PII redaction logic 210 can redact any PII in the diagnostic data. This is indicated by block 294. Payload generation logic 212 then illustratively generates a diagnostic data payload as indicated by block 296. One example of this is shown at 216 in FIG. 5. The diagnostic data package can be generated in other ways as well, and this is indicated by block 298.

Communication system 158 then sends the diagnostic data package to a diagnostic service in a remote server environment (e.g., to service computing system 102 that may be located in the cloud, or in another remote server environment). This is indicated by block 300 in the flow diagram of FIG. 6.

Figure 7:
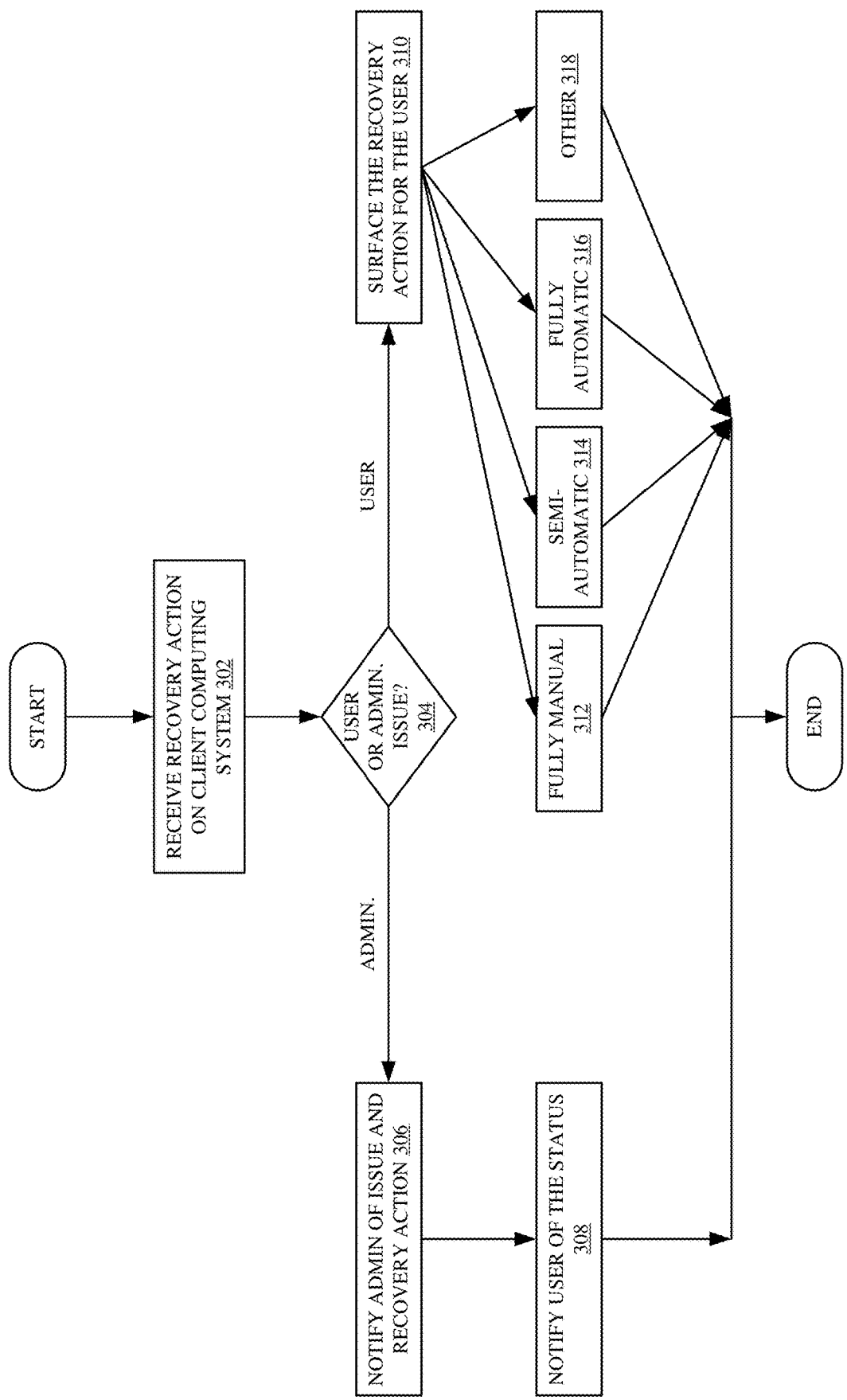
FIG. 7 is a flow diagram illustrating one example of the operation of the client computing system shown in FIG. 2 in receiving and surfacing a recovery action.

As will be discussed below with respect to FIGS. 8-10, the service computing system that receives the diagnostic data package can perform additional diagnostic functions to identify the problem and a possible remedial action and return that information to client computing system 106. FIG. 7 is a flow diagram illustrating one example of the operation of client computing system 106 when it receives that information. Communication system 158 first receives the recovery action on client computing system 106, from the service computing system that sent it. This is indicated by block 302 in the flow diagram of FIG. 7. In one example, the recovery action may be automatically performed, or it may be for the user to manually perform (either fully or partially). In another example, the recovery action may be performed by an administrative user that administers the client computing system. Determining whether the recovery action is for the user or an administrative user is indicated by block 304. If it is for an administrative user, then recovery action surfacing logic 160 generates control signals to control client computing system 106 to notify the administrative user of the issue and the recovery action. This is indicated by block 306. It then illustratively notifies the user of the status of the issue, for instance, by indicating that an administrative user has been alerted and is going to address the issue. This is indicated by block 308.

If, at block 304, it is determined that the recovery action is to be performed by the user, then recovery action surfacing logic 160 surfaces the recovery action for the user. This is indicated by block 310. For instance, if it is a fully manual recovery action, then logic 160 can use user interface logic 156 to generate a user interface display that explains to the user what the problem is and how to perform the recovery action. Surfacing a fully manual recovery action is indicated by block 312. If it is a semi-automatic recovery action, then logic 160 can use user interface logic 156 to surface instructions for the user to perform the manual part of the recovery action, while also generating control signals to control client computing system 106 to perform the automatic portions of the recovery action. This is indicated by block 314. Where the recovery action is fully automatic, then logic 160 generates control signals to control the various parts of client computing system 106 in order to address the problem, automatically. It can also generate a user interface (such as a display) alerting the user to this. This is indicated by block 316. Recovery action surfacing logic 160 can surface the recovery action to the user in other ways as well. This is indicated by block 318.

Figure 8:
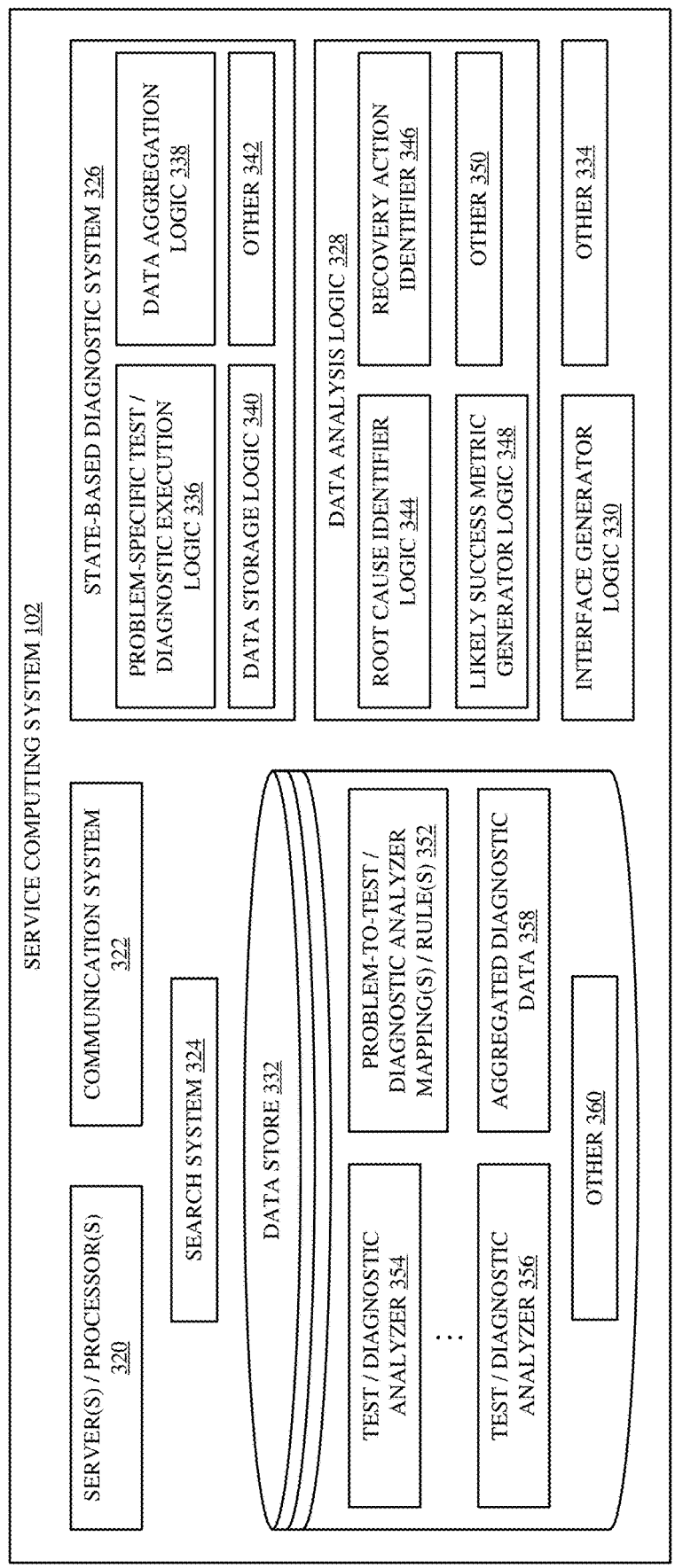
FIG. 8 is a more detailed block diagram showing one example of a service computing system.

FIG. 8 is a block diagram showing one example of service computing system 102 in more detail. Service computing system 102 illustratively includes one or more servers or processors 320, communication system 322, search system 324, state-based diagnostic system 326, data analysis logic 328, interface generator logic 330, data store 332, and it can include a wide variety of other items 334. State-based diagnostic system 326 can include problem-specific test/diagnostic execution logic 336, data aggregation logic 338, data storage logic 340, and it can include other items 342. Data analysis logic 328 can include root cause identifier logic 344, recovery action identifier logic 346, likely success metric generator logic 348, and it can include other items 350. In the example shown in FIG. 8, data store 332 illustratively includes problem-to-test/diagnostic analyzer mappings or rules 352, test/diagnostic analyzers 354-356, aggregated diagnostic data 358, and it can include other items 360.

Communication system 322 can communicate with the other items in architecture 100 over network 110, or in other ways. State-based diagnostic system 326 illustratively receives a diagnostic data package from a client computing system and can perform additional diagnostic functions with respect to that package. For instance, problem-specific test/diagnostic execution logic 336 can access mappings or rules 352 to identify any problem-specific analyzers 354-356 that can be run to generate additional data. Data aggregation logic 338 can then aggregate the data received from the client computing system with that generated on the cloud (by running the analyzers) to obtain aggregated data. Data storage logic 340 can store the aggregated diagnostic data as data 358 on data store 332, or elsewhere.

The aggregated data can also be provided to data analysis logic 328 where root cause identifier logic 344 identifies a root cause for the problem, based on the diagnostic data. Recovery action identifier logic 346 can identify a corresponding recovery action, and likely success metric generator logic 348 can identify a confidence measure (or metric) corresponding to the identified root cause and a confidence measure (or metric) corresponding to the identified recovery action, that is indicative of a likelihood (or other probability or indication) that the recovery action will be successful in addressing the issue. Communication system 322 can then be used to communicate this to the corresponding client computing system. As is described below with respect to FIG. 11, search system 324 can be accessed by a support computing system 112 in order to search the aggregated diagnostic data 358.

Figure 9:
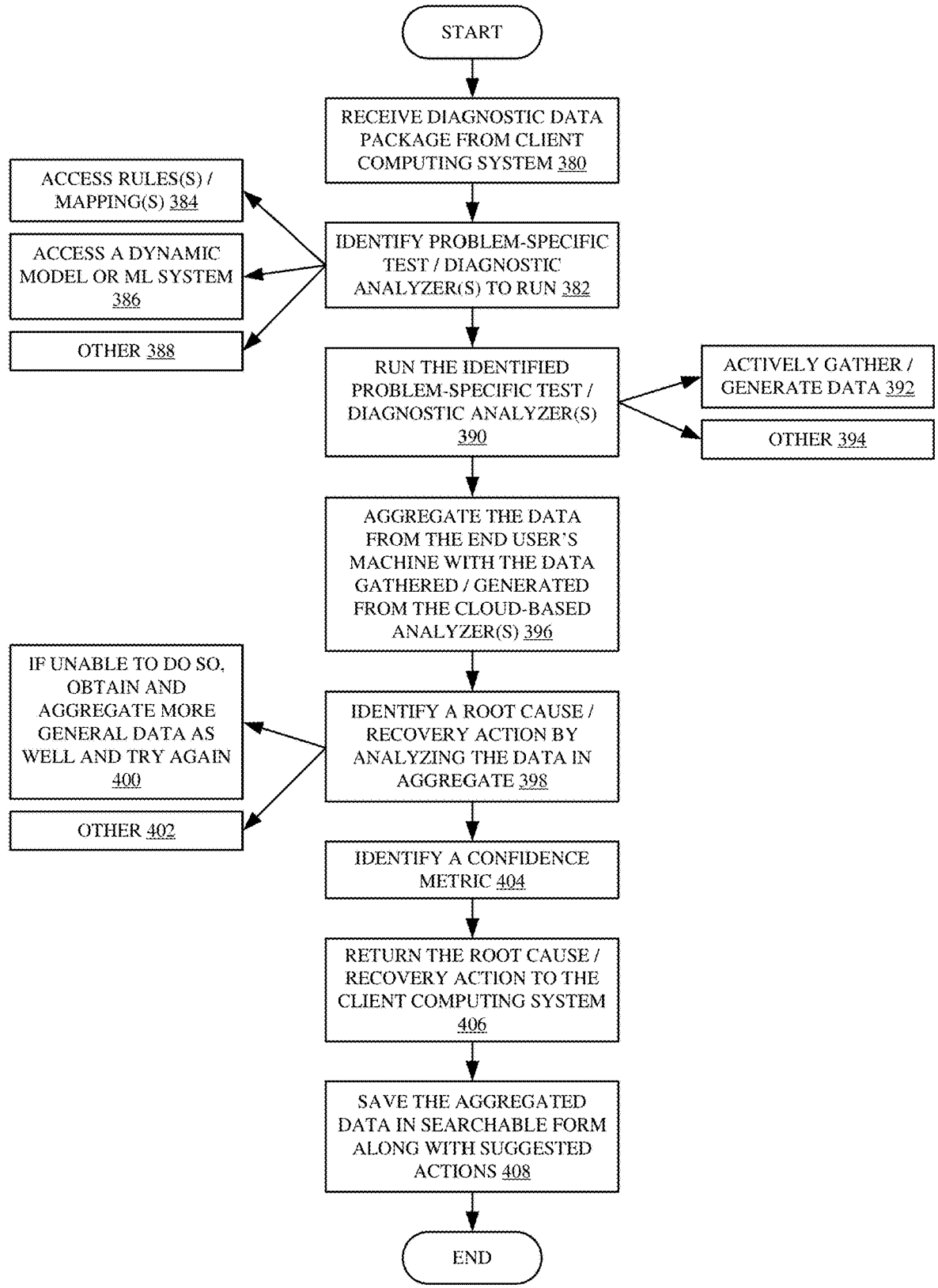
FIG. 9 is a flow diagram illustrating one example of the operation of the service computing system shown in FIG. 8 when it receives a diagnostic data package from a client computing system.

FIG. 9 is a flow diagram illustrating the operation of service computing system 102 in operating on a diagnostic data package that is received from a client computing system. First, communication system 323 receives the diagnostic data package from the client computing system. This is indicated by block 380 in the flow diagram of FIG. 9. State-based diagnostic system 326, and particularly problem-specific test/diagnostic execution logic 336, then identifies any problem-specific test or diagnostic analyzers to run, based upon the problem or problem scenario identified in the diagnostic data package. This is indicated by block 382. It can, for instance, access the problem-to-test or diagnostic analyzer mappings or rules 352. These mappings or rules map the problem to the particular analyzers 354-356 that should be run to obtain additional data. This is indicated by block 384 in the flow diagram of FIG. 9. It can access a dynamic model or a machine learning system, as discussed above with respect to FIG. 6. This is indicated by block 386 in the flow diagram of FIG. 9. It can identify the particular analyzers to run in other ways as well, and this is indicated by block 388.

Logic 336 then runs the identified problem-specific test or diagnostic analyzers. This is indicated by block 390. In doing so, it can actively gather or generate any additional data regarding the problem or problem scenario. This is indicated by block 392. It can run the analyzers in other ways as well, and this is indicated by block 394.

Once the additional data is gathered or generated by the analyzers, data aggregation logic 338 illustratively aggregates the data from the end user's machine (e.g., from the client computing system 106) with the data gathered or generated from the cloud-based analyzers executed by execution logic 336. Aggregating the data is indicated by block 396 in the flow diagram of FIG. 9.

The aggregated data can be provided to data analysis logic 328, where root cause identifier logic 344 identifies the root cause for the problem or problem scenario, based upon the aggregated diagnostic data received. This is indicated by block 398. Recovery action identifier logic 346 illustratively identifies a corresponding recovery action for that root cause. If, for some reason, the root cause or corresponding recovery action cannot be identified, then this can be output by data analysis logic 328 and state-based diagnostic system 326 can then obtain more general data (either from client computing system 106 or by running additional analyzers 354-356, or in other ways) and attempt to identify the root cause and corresponding recovery action again. This is indicated by block 400. If that is unsuccessful, then a message can be generated for a support person or other person indicating that the root cause cannot be identified.

Identifying a root cause and recovery action can be done by accessing mappings or rules that map between various items or combinations of diagnostic data and a root cause, or by accessing a dynamic model or machine learning system, or by accessing other components or systems to identify the root cause. This is indicated by block 402.

Likely success metric generator logic 348 then generates a confidence metric corresponding to the root cause and to the corresponding recovery action. The confidence metric may be two metrics, one corresponding to a confidence that the system has that the identified root cause is correct, and the other being the confidence that the system has in the recovery action. It can be a single combined confidence metric, or it can be another metric. The confidence metric may be a probability, a likelihood, or any of a wide variety of other confidence metrics. Identifying a confidence metric is indicated by block 404 in the flow diagram of FIG. 9.

Data analysis logic 328 then uses communication system 322 to return the root cause and corresponding recovery action to client computing system 106. This is indicated by block 406. The root cause and recovery action are then received by the recovery action surfacing logic 160 and processed as described above with respect to FIG. 7.

At some point, data storage logic 340 illustratively stores the aggregated data in searchable form, along with the suggested actions. The information can be stored as aggregated diagnostic data 358 in data store 322, or elsewhere. Storing the data is indicated by block 408 in the flow diagram of FIG. 9.

Figure 10:
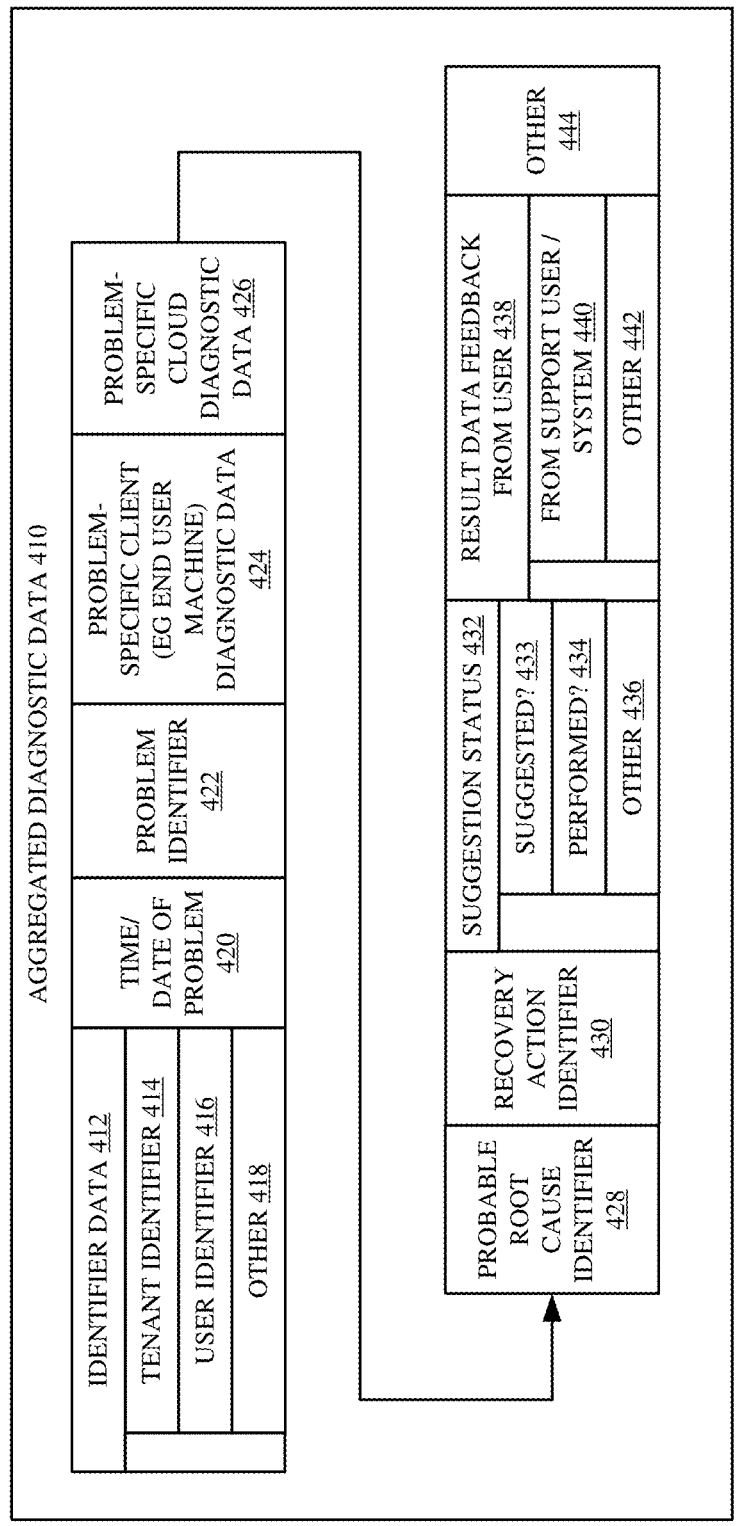
FIG. 10 is a block diagram showing one example of aggregated diagnostic data.

FIG. 10 shows one example of a set of aggregated diagnostic data 410. The aggregated diagnostic data can include identifier data 412, which, itself, can include a tenant identifier 414 and a user identifier 416 that indicate the tenant and user where the problem occurred or was encountered. It can include other identifier data 418 as well. The aggregated data can include a time/date portion 420 that indicates a time and date when the problem occurred. It can include a problem identifier 422 that identifies the problem or problem scenario received from the client computing system. It can identify the problem-specific client diagnostic data 424 that was generated by the end user machine (or client computing system 106). It can also identify the problem-specific cloud diagnostic data 426 that was generated by the state-based diagnostic system 326 in service computing system 102. It can include a probable root cause identifier 428 that identifies the probable root cause, and a recovery action identifier 430 that identifies the recovery action corresponding to the probable root cause. The aggregated data 410 can also include a suggestion status 432 that indicates whether the recovery action was actually suggested at the client computing system, as indicated by block 432, and whether the recovery action was performed as indicated by block 434. It can include other items 436 as well.

Aggregated diagnostic data 410 can also include result data 438 that is indicative of feedback received from a user, from a support user or a support system 440, or other feedback data 442. The result data 438 may indicate a result achieved by taking the recovery action, such as whether it fixed the problem. It can include a wide variety of other information as well, and this is indicated by block 444.

Figure 11:
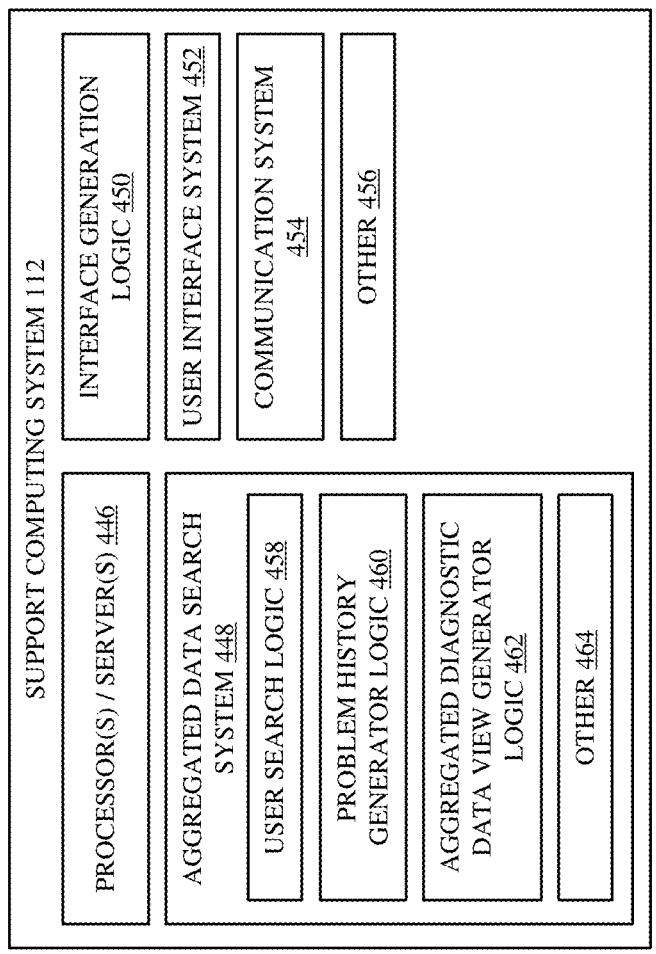
FIG. 11 is a more detailed block diagram showing one example of a support computing system.

FIG. 11 is a more detailed block diagram showing one example of a support computing system 112. In the example shown in FIG. 11, support computing system 112 can include one or more processors or servers 446, aggregated data search system 448, interface generation logic 450, user interface system 452, communication system 454, and it can include a wide variety of other items 456. Aggregated data search system 448 can, itself, include user search logic 458, problem history generator logic 460, aggregated diagnostic view generator logic 462, and it can include a wide variety of other items 464.

User search logic 458 illustratively generates a user interface (in conjunction with user interface system 452) with user input mechanisms that allow support user 128 to search the aggregated diagnostic data 358 on service computing system 102 based on the particular end user or based on other criteria. For instance, it can illustratively search the data to identify problems encountered by a particular user and/or a particular tenant. Problem history generator logic 460 illustratively generates a problem history for the user and/or tenant, showing the aggregated data which identifies the various problems that were encountered by that user and/or tenant. It can do this by displaying links that link to the underlying aggregated data corresponding to each problem. It can also display the aggregated data, itself, along with the identified problems, in a historical view. Aggregated diagnostic data view generator logic 462 illustratively generates a view of the aggregated diagnostic data for the various problems. The view can aggregate the data over various criteria, such as over a user, over a tenant, over a set of tenants, over tenants with particular computing system configurations, etc. All of these and other search scenarios are contemplated herein.

When the support user 128 configures a search using aggregated data search system 448, system 448 illustratively uses communication system 454 to communicate with search system 324 in service computing system 102, in order to execute the search. The search results can then be returned and a view of the aggregated data search results can be generated either by aggregated data search system 448, or interface generation logic 450, or in other ways. For instance, the user interface display may be a support dashboard where support users 128 can search for a specific user and view a history of problems that the user has encountered, as well as both client and cloud diagnostic data that was collected at the time of each problem. The diagnostic data will be focused to problem-specific data, and this can greatly enhance the ability of a support user 128 to address the problems or issues corresponding to the diagnostic data.

FIGS. 12A-12E show examples of user interface displays that can be generated by client computing system 106 and surfaced for user 122. In the example shown in FIG. 12A, a user interface display 466 is generated in an electronic mail system. Display 466 shows a folders pane 468, a messages pane 470, and a reading pane 472. It also illustratively includes a help pane 474. Help pane 474 is shown with a user input text box 476. When a user enters text in text box 476, this is detected by user input detector 184 in problem detection logic 140 (shown in FIG. 3). It can perform natural language processing analysis on the text and generate a search which searches data store 164 (or another data store) to identify search results 478 that correspond to problem scenarios that are identified based on the textual input. The results portion can include links, such as link 480 that links to state-based diagnostic engine 142 and causes state-based diagnostic engine 142 to run one or more of the problem-specific test/diagnostic analyzers 170-172 to obtain additional diagnostic data.

Figure 12A:
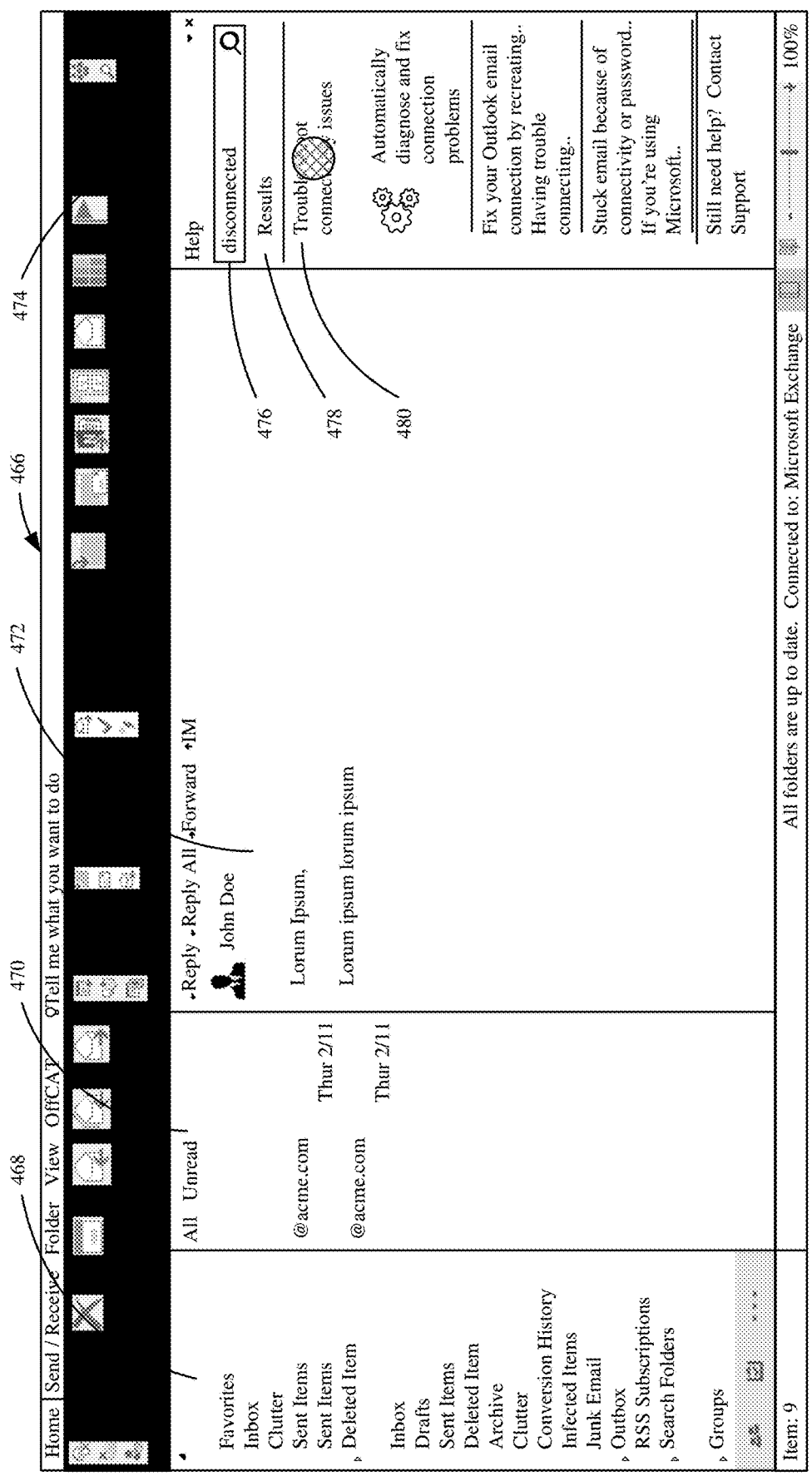
FIGS. 12A-12E show examples of user interfaces that can be used.
Figure 12B:
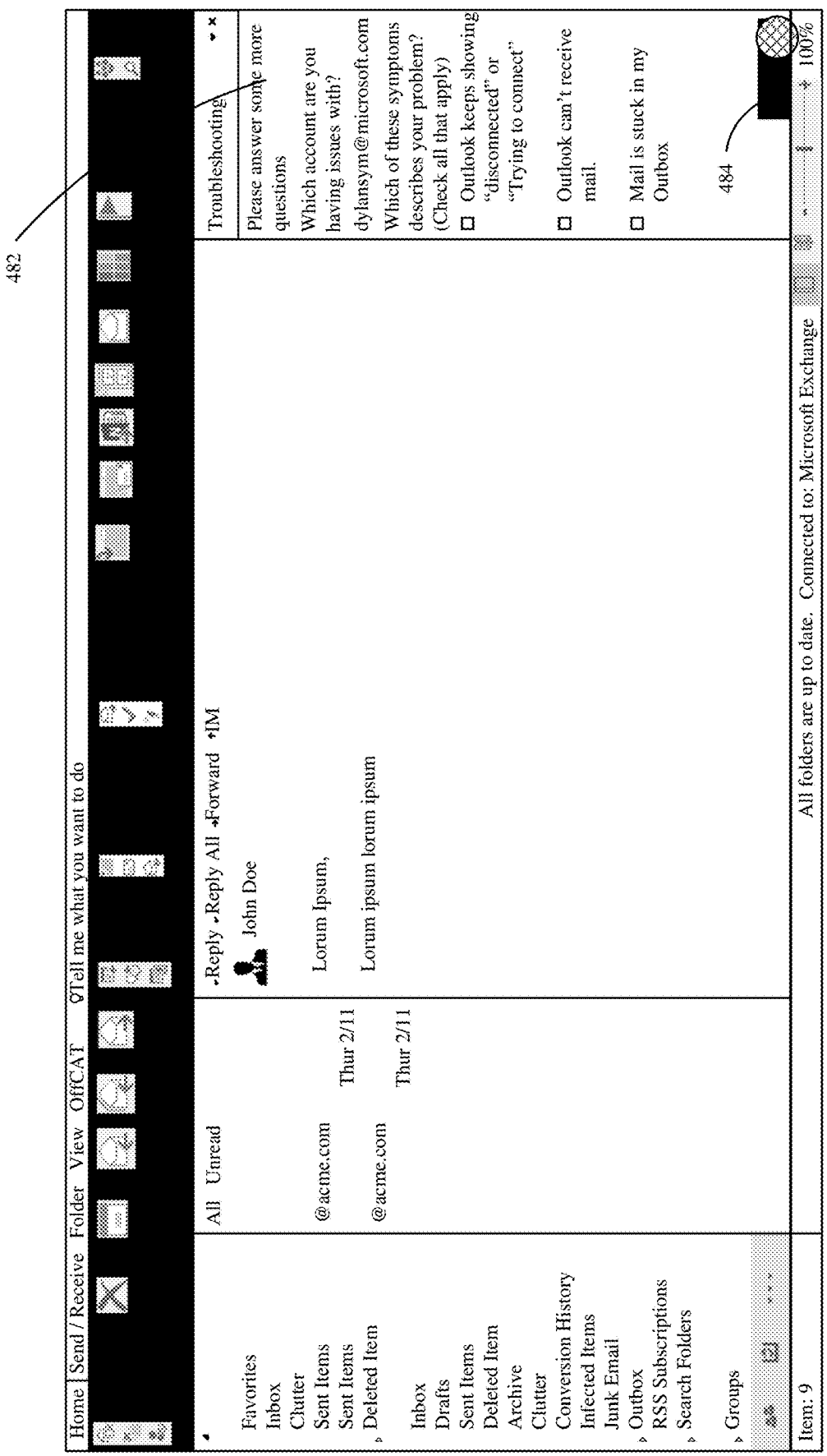

FIG. 12B is similar to FIG. 12A, and similar items are similarly numbered. However, in FIG. 12B, problem detection logic 140 illustratively generates an additional set of questions, identified generally at 482 which gather additional information from the user so a problem or problem scenario can be identified. In the example shown in FIG. 12B, the additional questions ask the user to enter an account that the user is having issues with, and to describe the problem by checking a check box that corresponds to one or more different problem scenarios.

Figure 12C:
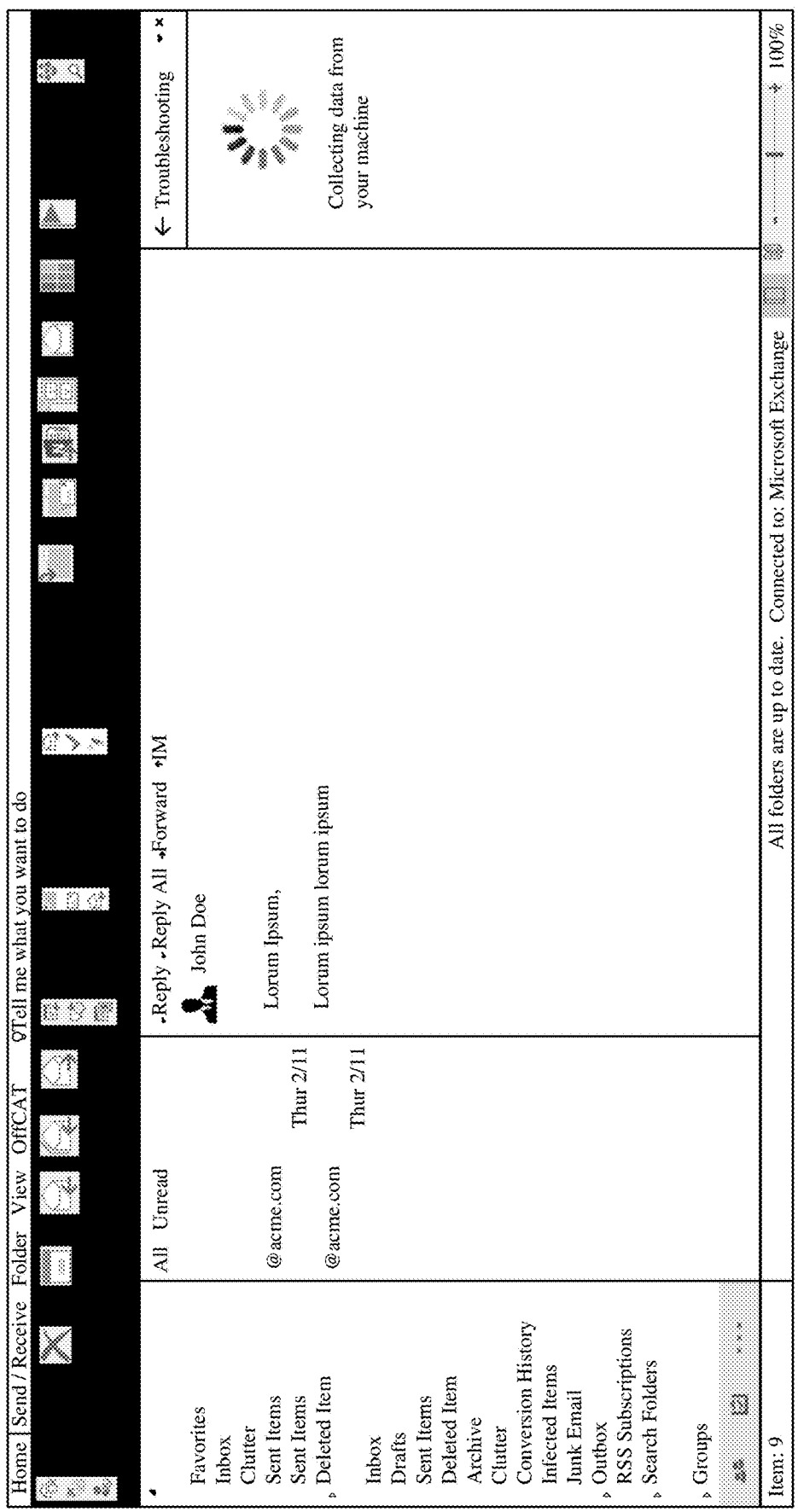

When the user does this, and actuates a next actuator 484, problem-specific data collection logic 144 begins collecting data from the logs on the user's machine. This is illustrated in FIG. 12C. During that time, problem-specific test/diagnostic execution logic 146 can also identify any problem-specific analyzers to run and run those analyzers, locally, to generate additional information.

Figure 12D:
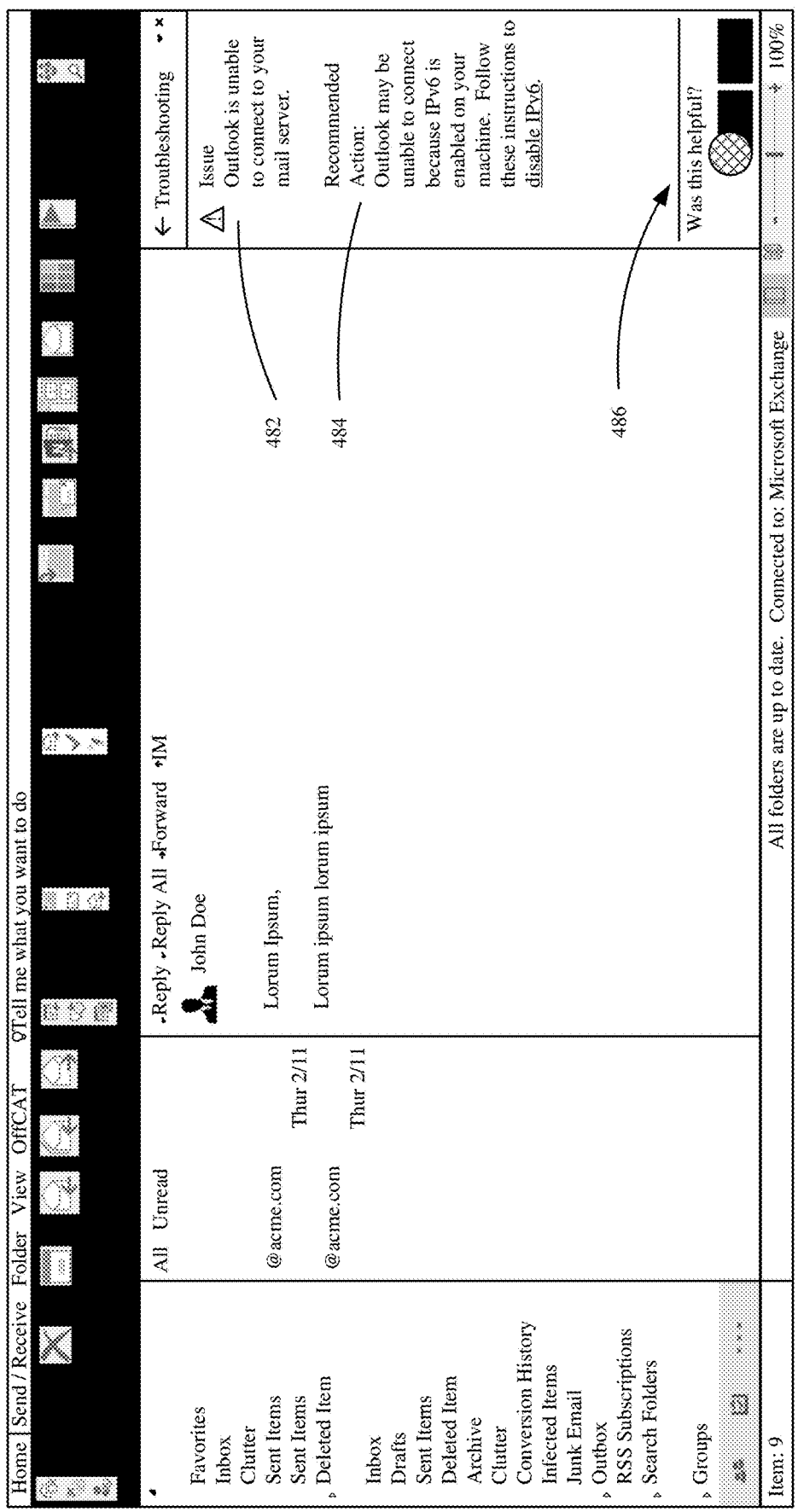

FIG. 12D is similar to FIG. 12C, and similar items are similarly numbered. However, it can be seen in FIG. 12D that an issue 482 has been identified, along with a suggested recovery action 484. This can be done either locally on client computing system 106 (as described above) or it can be done by accessing one of the service computing systems (such as service computing system 102 described above) and receiving the problem identifier and corresponding recovery action from the service computing system. FIG. 12D also shows that the user can actuate a helpfulness actuator shown generally at 486 to provide feedback indicating whether the suggested action was helpful. This can be used by dynamic models or machine learning systems in order to better identify problems or problem scenarios, root causes, and corresponding recovery actions that will be effective in addressing the root cause.

Figure 12E:
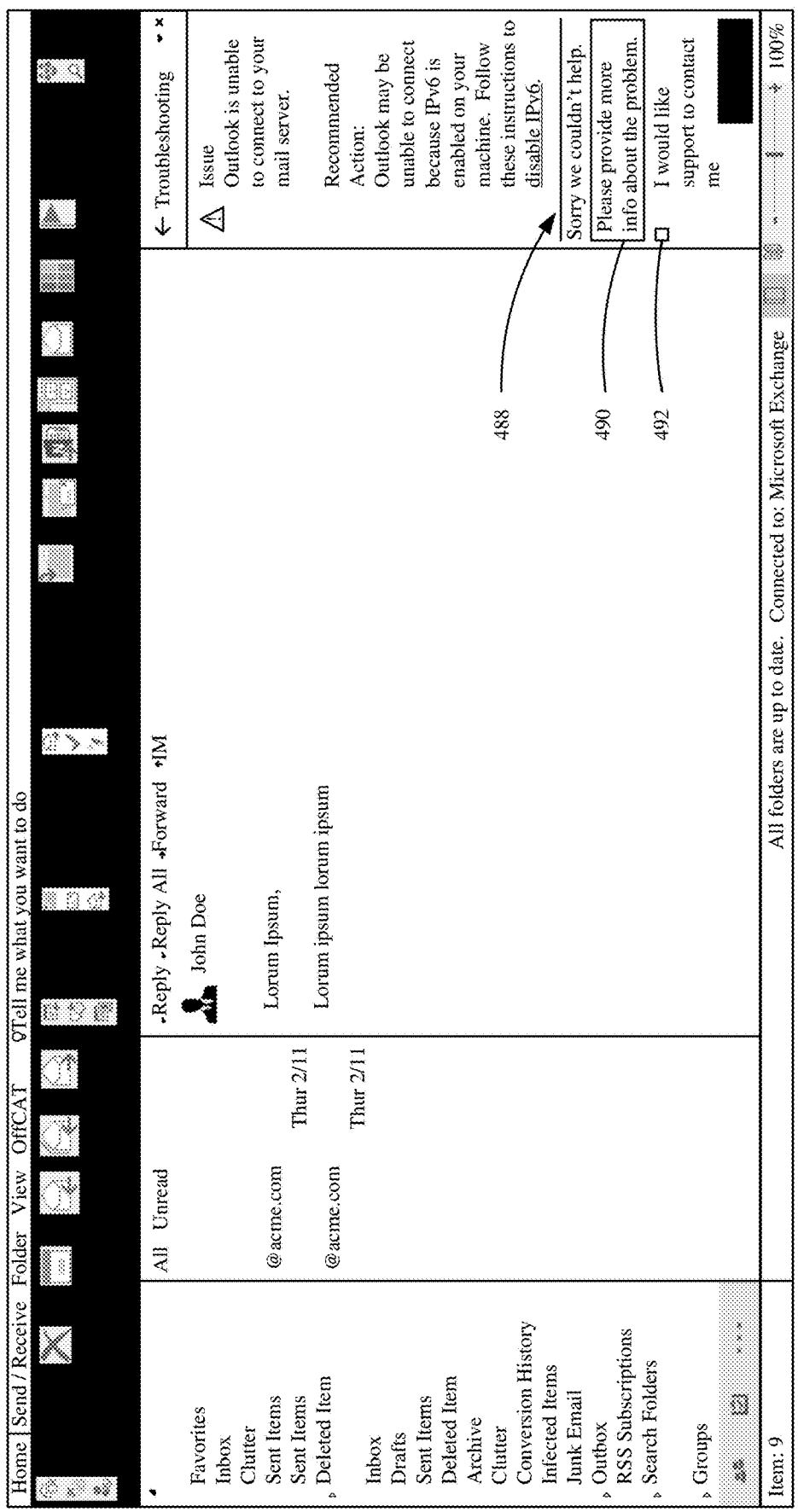

FIG. 12E is similar to FIG. 12D, and similar items are similarly numbered. However, as shown in FIG. 12E, feedback system 154 allows the user to enter additional feedback or textual information (such as in text box 490) describing the problem. It also allows the user to indicate (such as using check box 492) that the user would like a support agent (or support user 112) to contact the user. When the user actuates actuator 492, this can be used to automatically open a ticket or other support request on support computing system 112. When that occurs, a support user 128 can illustratively be put in communication with the user of the client computing system, through communication system 454, or in other ways. The support user can then search the diagnostic data for that user or tenant to identify prior problems and prior approaches that have been attempted in order to fix the problem, etc. The support user 112 can also consider current problems, such as when such problems are selected by, or otherwise escalated to, support user 112. Support user 112 can then determine whether the problem is user-specific or systematic, and take remedial action.

It can thus be seen that the present description greatly enhances the accuracy and extensibility of the computing system itself. Specific analyzers are identified and run to get targeted diagnostic data, which leads to better problem resolution and enhanced performance. The system can easily be extendable to address new issues, by adding new analyzers. Support personnel can also easily access the aggregated data to assist users or to address problems in an application.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 13:
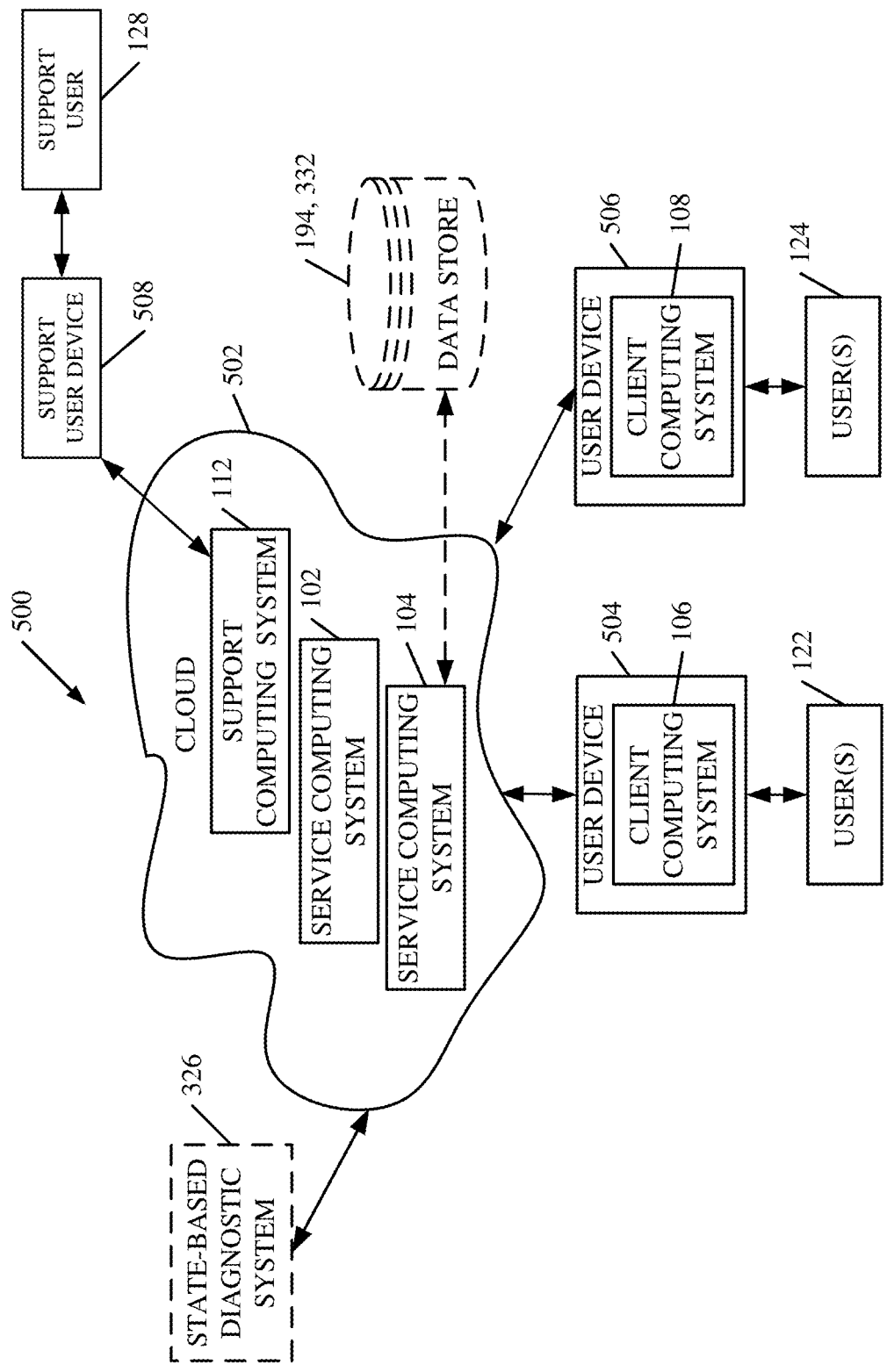
FIG. 13 is a block diagram showing one example of the architecture illustrated in FIG. 1, deployed in a cloud computing architecture.

FIG. 13 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 13, some items are similar to those shown in FIG. 1 and they are similarly numbered. FIG. 13 specifically shows that the service computing systems 102-104 and support computing system 112 can be located in cloud 502 (which can be public, private, or a combination where portions are public while others are private). Therefore, users 122, 124 and 128 can use user devices 504, 506 and 508 to access those systems through cloud 502.

FIG. 13 also depicts another example of a cloud architecture. FIG. 13 shows that it is also contemplated that some elements of service computing systems 122 or 124 or other computing systems in architecture 100 can be disposed in cloud 502 while others are not. By way of example, data stores 164, 332 can be disposed outside of cloud 502, and accessed through cloud 502. In another example, state-based diagnostic system 326 (or other parts) can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 14:
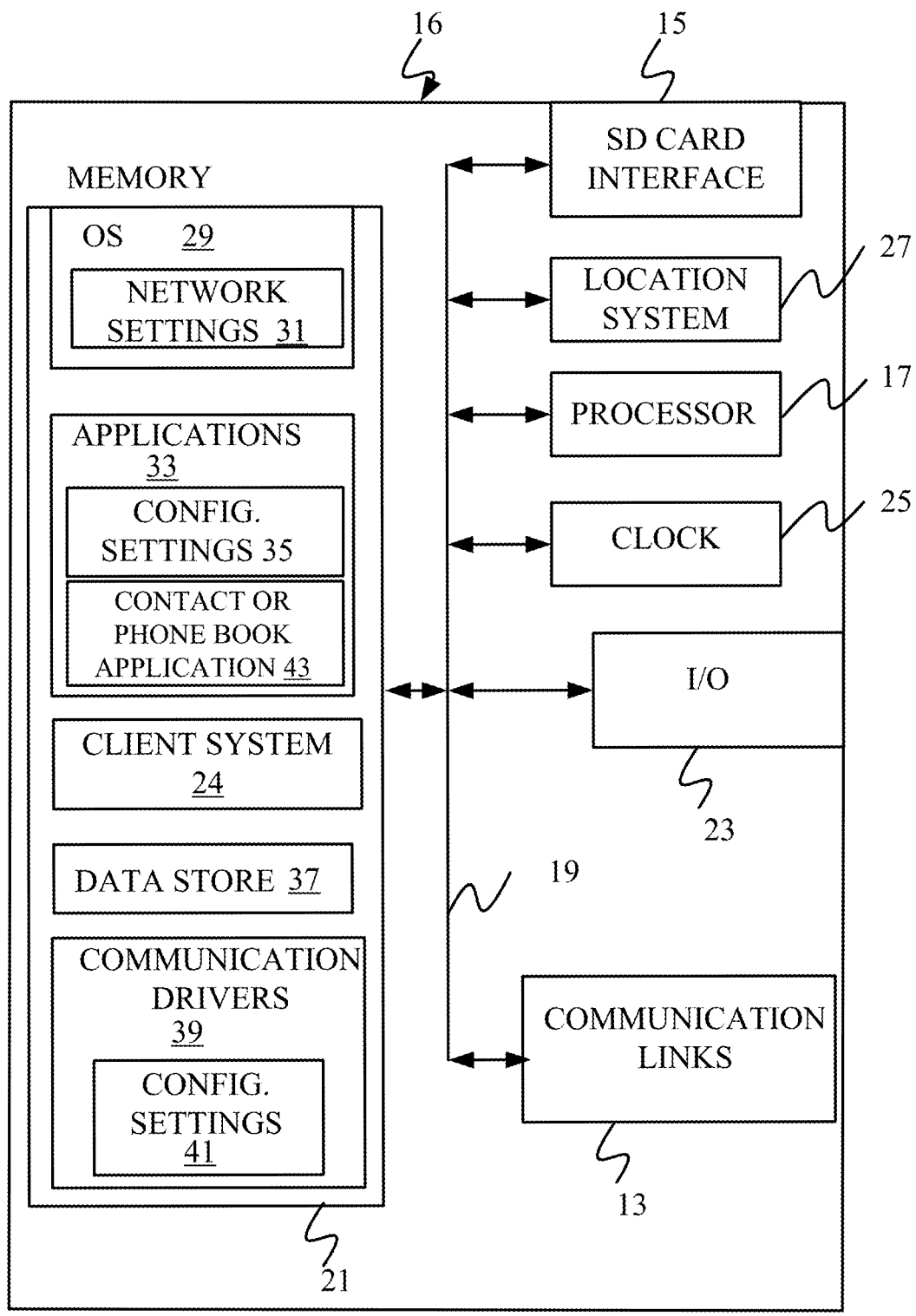
FIGS. 14-16 show examples of mobile devices that can be used in the architectures illustrated in the previous figures.
Figure 15:
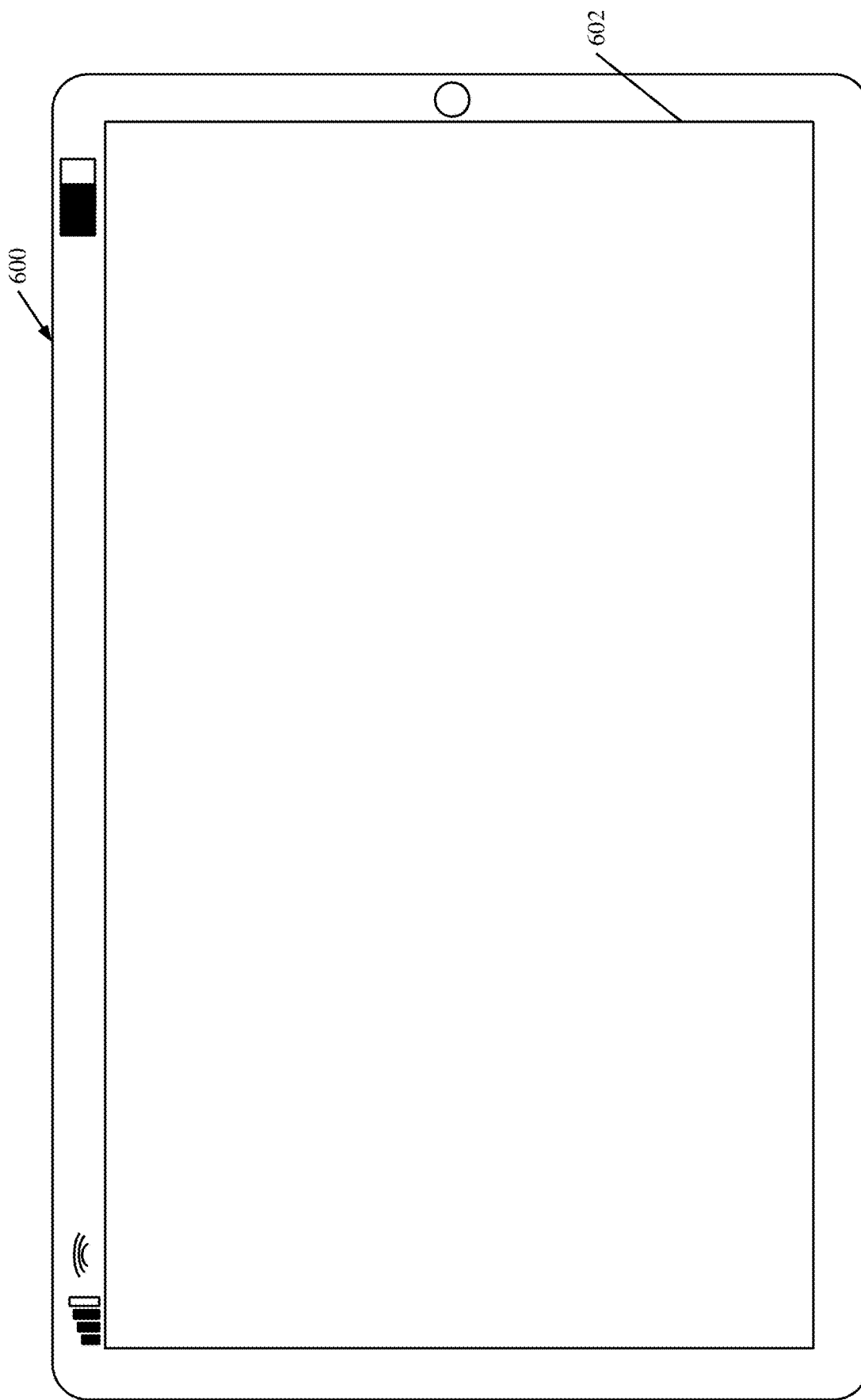
Figure 16:
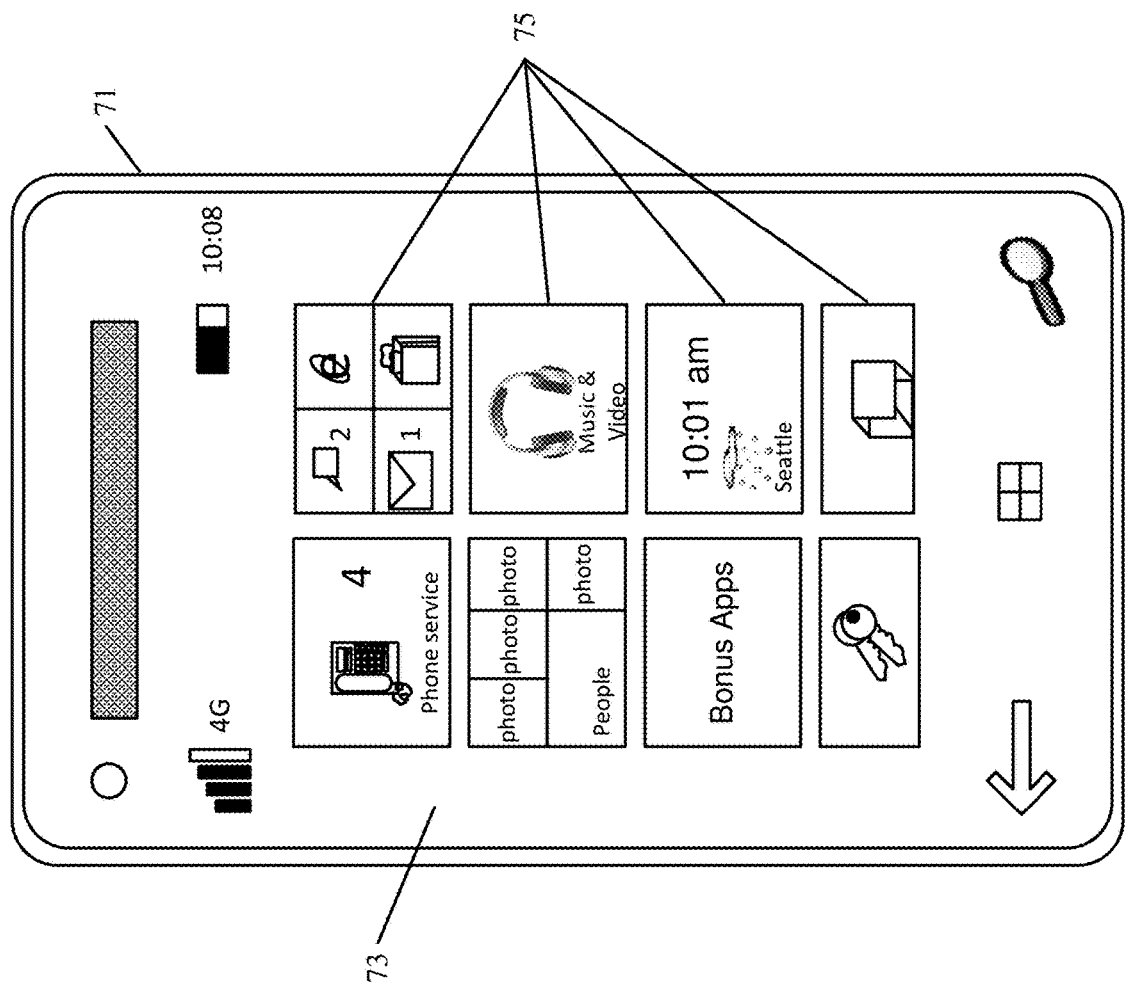

FIG. 14 is a simplified block diagram of one illustrative embodiment of a handheld or mobile computing device that can be used as a user's or client's hand held device 16, in which the present system (or parts of it) can be deployed. FIGS. 15-16 are examples of handheld or mobile devices.

FIG. 14 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network connectivity (or wireless link) allowing communication through one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors 130, 320 or 446 from previous FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of a client computing system 106-108. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 15 shows one example in which device 16 is a tablet computer 600. In FIG. 15, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 16 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 17:
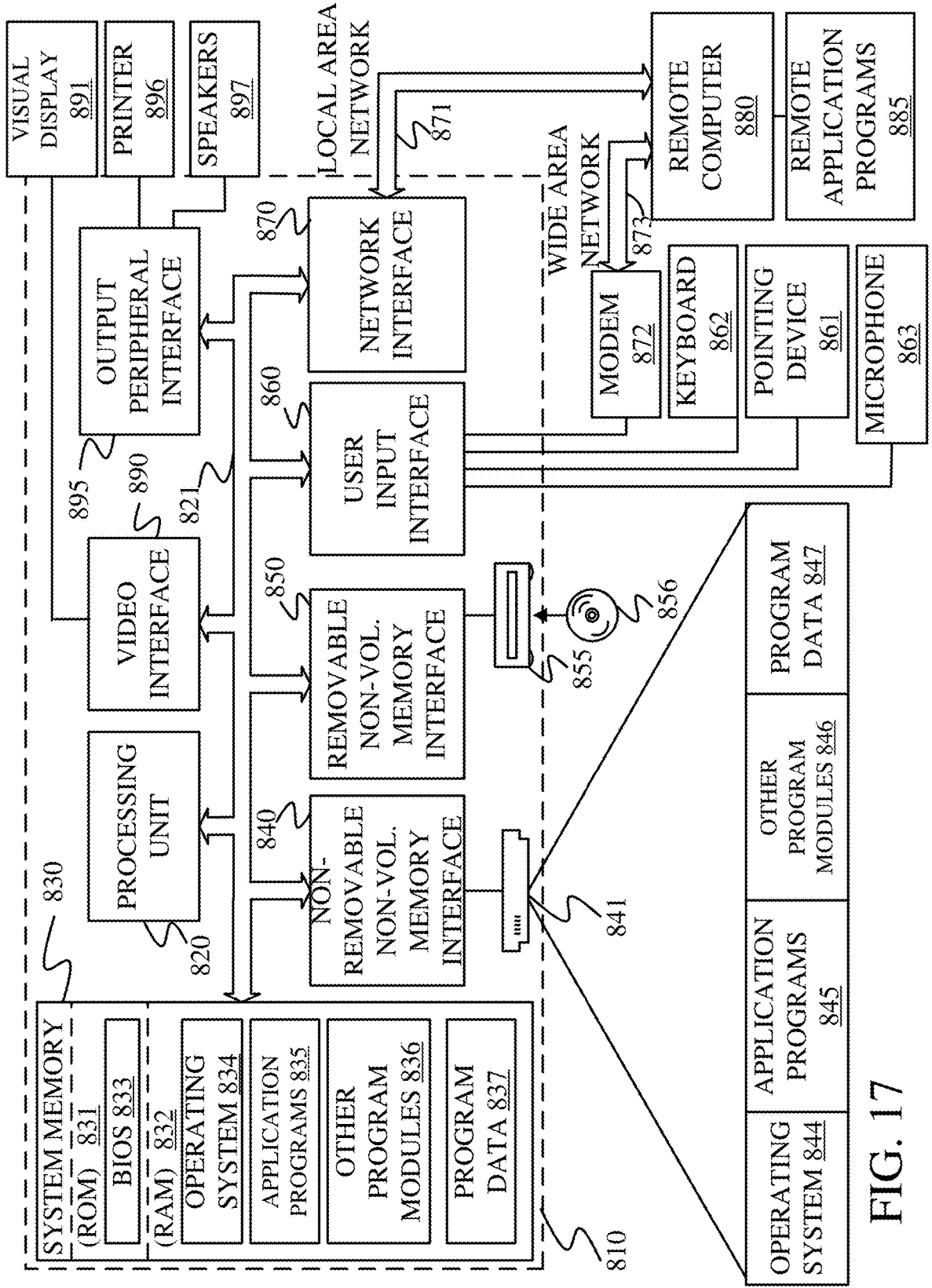
FIG. 17 is a block diagram of one example of a computing environment that can be used in the architectures shown in the previous figures.

FIG. 17 is one example of a computing environment in which architecture 100, or parts of it, (for example) can be deployed. With reference to FIG. 17, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to previous FIGS. can be deployed in corresponding portions of FIG. 17.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 17 illustrates operating system 834, application programs 835, other program modules 836, and program data 837.

The computer 810 may also include other removable/non-removable volatile/nonvolatile computer storage media. By way of example only, FIG. 17 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The drives and their associated computer storage media discussed above and illustrated in FIG. 17, provide storage of computer readable instructions, data structures, program modules and other data for the computer 810. In FIG. 17, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 17 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 17 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
a communication system that receives a diagnostic data package from a client computing system, the diagnostic data package including a problem scenario identifier and a set of problem-specific diagnostic data obtained from the client computing system;
a state-based diagnostic system that runs a problem-specific diagnostic analyzer, based on the problem scenario identifier, to obtain problem-specific diagnostic information from a remote server environment in which the computing system is deployed; and
data analysis logic that identifies an estimated root cause for the problem scenario based on aggregated data that includes the diagnostic data package and the problem-specific diagnostic information from the remote server environment obtained by running a problem-specific diagnostic analyzer, the data analysis logic identifying a suggested recovery action, based on the estimated root cause, the communication system communicating the suggested recovery action to the client computing system.

Example 2 is the computing system of any or all previous examples wherein the state-based diagnostic system comprises:
problem-specific diagnostic execution logic configured to access a problem-to-diagnostic analyzer mapping to identify the problem-specific diagnostic analyzer and run the problem-specific diagnostic analyzer to obtain the problem-specific diagnostic information from the remote server environment.

Example 3 is the computing system of any or all previous examples wherein the state-based diagnostic system comprises:
data aggregation logic configured to aggregate the diagnostic data package and the problem-specific diagnostic information from the remote server environment obtained by running a problem-specific diagnostic analyzer, to obtain the aggregated data.

Example 4 is the computing system of any or all previous examples wherein the data analysis logic comprises:
root cause identifier logic configured to receive the aggregated data and identify the estimated root cause of the problem scenario; and
recovery action identifier logic configured to identify the suggested recovery action based on the estimated root cause.

Example 5 is the computing system of any or all previous examples wherein the data analysis logic comprises:
likely success metric generator logic configured to generate a root cause confidence metric indicative of a confidence level corresponding to the estimated root cause, the communication system communicating the root cause confidence metric and the estimated root cause to the client computing system along with the suggested recovery action.

Example 6 is the computing system of any or all previous examples wherein the likely success metric generator logic is configured to generate a recovery action confidence metric indicative of a confidence level corresponding to the suggested recovery action, the communication system communicating the recovery action confidence metric to the client computing system along with the suggested recovery action.

Example 7 is the computing system of any or all previous examples and further comprising:
data storage logic configured to generate an aggregated data record corresponding to the problem scenario and including the aggregated data along with identifier data identifying a client computing system, root cause identifier information identifying the estimated root cause, recovery action identifier information identifying the suggested recovery action, suggestion status information indicative of whether the suggested recovery action was surfaced for the user and whether it was performed, and result data indicative of a result of performing the suggested recovery action.

Example 8 is the computing system of any or all previous examples wherein the identifier data comprises a tenant identifier and a user identifier and wherein the data storage logic is configured to store the aggregated data record, with a time indicator indicating a time corresponding to the problem scenario, so the aggregated data record can be identified based on a time when the problem scenario was detected by tenant and user.

Example 9 is a computer implemented method, comprising:
receiving, at a server environment that is remote from a client computing system, a diagnostic data package from a client computing system, the diagnostic data package including a problem scenario identifier and a set of problem-specific diagnostic data obtained from the client computing system;
running a problem-specific diagnostic analyzer, based on the problem scenario identifier, to obtain problem-specific diagnostic information from the remote server environment;
identifying an estimated root cause for the problem scenario based on aggregated data that includes the diagnostic data package and the problem-specific diagnostic information from the remote server environment obtained by running a problem-specific diagnostic analyzer;
identifying a suggested recovery action, based on the estimated root cause; and
communicating the suggested recovery action to the client computing system.

Example 10 is the computer implemented method of any or all previous examples wherein running a problem-specific diagnostic analyzer comprises:
accessing a problem-to-diagnostic analyzer mapping to identify the problem-specific diagnostic analyzer; and
running the problem-specific diagnostic analyzer to obtain the problem-specific diagnostic information from the remote server environment.

Example 11 is the computer implemented method system of any or all previous examples and further comprising:
generating the aggregated data by aggregating the diagnostic data package and the problem-specific diagnostic information from the remote server environment obtained by running a problem-specific diagnostic analyzer.

Example 12 is the computer implemented method of any or all previous examples wherein identifying an estimated root cause comprises:
receiving the aggregated data; and
identifying the estimated root cause of the problem scenario by accessing a mapping that correlates the problem scenario and aggregated data to the estimated root cause.

Example 13 is the computer implemented method of any or all previous examples and further comprising:
generating a root cause confidence metric indicative of a confidence level corresponding to the estimated root cause; and
communicating the root cause confidence metric and the estimated root cause to the client computing system along with the suggested recovery action.

Example 14 is the computer implemented method of any or all previous examples and further comprising:
generating a recovery action confidence metric indicative of a confidence level corresponding to the suggested recovery action; and
communicating the recovery action confidence metric to the client computing system along with the suggested recovery action.

Example 15 is the computer implemented method of any or all previous examples and further comprising:
generating an aggregated data record corresponding to the problem scenario and including the aggregated data along with identifier data identifying a client computing system, root cause identifier information identifying the estimated root cause, recovery action identifier information identifying the suggested recovery action, suggestion status information indicative of whether the suggested recovery action was surfaced for the user and whether it was performed, and result data indicative of a result of performing the suggested recovery action.

Example 16 is the computer implemented method of any or all previous examples wherein the identifier data comprises a tenant identifier and a user identifier and further comprising:
storing the aggregated data record, with a time indicator indicating a time corresponding to the problem scenario, so the aggregated data record can be identified based on when problem scenarios arose and by tenant and user.

Example 17 is a computing system, comprising:
a communication system that receives a diagnostic data package from a client computing system, the diagnostic data package including a problem scenario identifier and a set of problem-specific diagnostic data obtained from the client computing system;
problem-specific diagnostic execution logic configured to access a problem-to-diagnostic analyzer mapping, based on the problem scenario identifier, to identify a problem-specific diagnostic analyzer and run the problem-specific diagnostic analyzer to obtain problem-specific diagnostic information from a remote server environment in which the computing system is deployed;
data aggregation logic configured to aggregate the diagnostic data package and the problem-specific diagnostic information from the remote server environment obtained by running the problem-specific diagnostic analyzer, to obtain the aggregated data; and
data analysis logic that identifies an estimated root cause for the problem scenario based on aggregated data that includes the diagnostic data package and the problem-specific diagnostic information from the remote server environment obtained by running the problem-specific diagnostic analyzer, the data analysis logic identifying a suggested recovery action, based on the estimated root cause, the communication system communicating the suggested recovery action to the client computing system.

Example 18 is the computing system of any or all previous examples wherein the data analysis logic comprises:
root cause identifier logic configured to receive the aggregated data and identify the estimated root cause of the problem scenario;
recovery action identifier logic configured to identify the suggested recovery action based on the estimated root cause; and
likely success metric generator logic configured to generate a root cause confidence metric indicative of a confidence level corresponding to the estimated root cause, the communication system communicating the root cause confidence metric and the estimated root cause to the client computing system along with the suggested recovery action.

Example 19 is the computing system of any or all previous examples wherein the likely success metric generator logic is configured to generate a recovery action confidence metric indicative of a confidence level corresponding to the suggested recovery action, the communication system communicating the recovery action confidence metric to the client computing system along with the suggested recovery action.

Example 20 is the computing system of any or all previous examples and further comprising:
data storage logic configured to generate an aggregated data record corresponding to the problem scenario and including the aggregated data along with identifier data identifying a client computing system, root cause identifier information identifying the estimated root cause, recovery action identifier information identifying the suggested recovery action, suggestion status information indicative of whether the suggested recovery action was surfaced for the user and whether it was performed, and result data indicative of a result of performing the suggested recovery action.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a computing system deployed in a data center, the method comprising:
   receiving, from a computing device, a problem scenario identifier that identifies a problem scenario representing a problem associated with an application;
   accessing mapping information that maps a set of problem scenarios to a plurality of different problem-specific diagnostic analyzers;
   selecting a problem-specific diagnostic analyzer, that is specific to the problem, from the plurality of different problem-specific diagnostic analyzers based on the problem scenario identifier relative to the mapping information;
   running the selected problem-specific diagnostic analyzer in the data center to obtain problem-specific diagnostic data that is specific to the problem, the problem-specific diagnostic data including:
      first data representing execution of the application and second data representing execution of the data center;
   identifying a suggested recovery action based on the first data and the second data in the problem-specific diagnostic data; and
   generating an output that represents the identified suggested recovery action.

2. The method of claim 1, and further comprising:
   identifying an estimated root cause for the problem scenario by accessing a mapping that correlates the problem scenario and diagnostic data to the estimated root cause;
   generating a root cause confidence metric indicative of a confidence level corresponding to the estimated root cause; and
   generating the output that includes the root cause confidence metric and the estimated root cause along with the suggested recovery action.

3. The method of claim 1, and further comprising:
   generating a recovery action confidence metric indicative of a confidence level corresponding to the suggested recovery action; and
   generating the output that includes the recovery action confidence metric along with the suggested recovery action.

4. The method of claim 1, and further comprising:
   aggregating the first data and the second data to obtain aggregated data; and
   generating an aggregated data record that corresponds to the problem scenario and includes:
      the aggregated data,
      an identifier data that identifies the computing device,
      root cause identifier information identifying the estimated root cause, and
      recovery action identifier information identifying the suggested recovery action.

5. The method of claim 4, wherein the identifier data comprises a tenant identifier and a user identifier, and further comprising:
   storing the aggregated data record, with a time indicator indicating a time corresponding to the problem scenario, so the aggregated data record can be identified based on when problem scenarios arose, and by tenant and user.

6. The method of claim 5, wherein the aggregated data record includes suggestion status information indicative of whether the suggested recovery action was surfaced for a user identified by the user identifier and whether it was performed, and result data indicative of a result of performing the suggested recovery action.

7. The method of claim 1, wherein generating an output comprises:
   sending an indication of the identified suggested recovery action to the computing device.

8. The method of claim 1, wherein generating an output comprises:
   sending an indication of the identified suggested recovery action to a support computing system.

9. The method of claim 1, wherein the computing device comprises a client computing device.

10. The method of claim 1, wherein the computing device is associated with the data center.

11. A data center computing system comprising:
    at least one processor; and
    memory storing instructions executable by the at least one processor, wherein the instructions, when executed, configure the data center computing system to:
       receive, from a computing device, a problem scenario identifier that identifies a problem scenario representing a problem associated with an application;
       access mapping information that maps a set of problem scenarios to a plurality of different problem-specific diagnostic analyzers;
       select a problem-specific diagnostic analyzer, that is specific to the problem, from the plurality of different problem-specific diagnostic analyzers based on the problem scenario identifier relative to the mapping information;
       run the selected problem-specific diagnostic analyzer in the data center computing system to obtain problem-specific diagnostic data that is specific to the problem, the problem-specific diagnostic data including:
          first data representing execution of the application; and
          second data representing execution of the data center computing system;
       identify a suggested recovery action based on the first data and the second data in the problem-specific diagnostic data; and
       generate an output that represents the identified suggested recovery action.

12. The data center computing system of claim 11, wherein the instructions configure the data center computing system to: identify an estimated root cause for the problem scenario by accessing a mapping that correlates the problem scenario and diagnostic data to the estimated root cause; generate a root cause confidence metric indicative of a confidence level corresponding to the estimated root cause; and generate the output that includes the root cause confidence metric and the estimated root cause along with the suggested recovery action.

13. The data center computing system of claim 11, wherein the instructions configure the data center computing system to:
    generate a recovery action confidence metric indicative of a confidence level corresponding to the suggested recovery action; and
    generate the output that includes the recovery action confidence metric along with the suggested recovery action.

14. The data center computing system of claim 11, wherein the instructions configure the data center computing system to:
    aggregate the first data and the second data to obtain aggregated data; and generate an aggregated data record that corresponds to the problem scenario and includes:
- the aggregated data,
- an identifier data that identifies the computing device,
- root cause identifier information identifying the estimated root cause, and
- recovery action identifier information identifying the suggested recovery action.

15. The data center computing system of claim 14, wherein the identifier data comprises a tenant identifier and a user identifier, and the instructions configure the data center computing system to:
store the aggregated data record, with a time indicator indicating a time corresponding to the problem scenario, so the aggregated data record can be identified based on when problem scenarios arose, and by tenant and user.

16. The data center computing system of claim 15, wherein the aggregated data record includes suggestion status information indicative of whether the suggested recovery action was surfaced for a user identified by the user identifier and whether it was performed, and result data indicative of a result of performing the suggested recovery action.

17. The data center computing system of claim 11, wherein the instructions configure the data center computing system to:
send an indication of the identified suggested recovery action to the computing device.

18. The data center computing system of claim 11, wherein the instructions configure the data center computing system to:
send an indication of the identified suggested recovery action to a support computing system.

19. The data center computing system of claim 11, wherein the computing device comprises a client computing device.

20. The data center computing system of claim 11, wherein the computing device is associated with the data center computing system.

* * * * *